(12) United States Patent
Ito

(10) Patent No.: US 7,019,130 B2
(45) Date of Patent: Mar. 28, 2006

(54) CELLULOSE ACETATE FILM HAVING CONTROLLED RETARDATION AND THICKNESS

(75) Inventor: Yoji Ito, Kanagawa (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 83 days.

(21) Appl. No.: 10/398,396

(22) PCT Filed: Oct. 19, 2001

(86) PCT No.: PCT/JP01/09207

§ 371 (c)(1),
(2), (4) Date: Apr. 7, 2003

(87) PCT Pub. No.: WO02/33454

PCT Pub. Date: Apr. 25, 2002

(65) Prior Publication Data

US 2004/0001175 A1 Jan. 1, 2004

(30) Foreign Application Priority Data

Oct. 20, 2000 (JP) .............................. 2000-320971

(51) Int. Cl.
*C08B 3/06* (2006.01)
*C09K 19/52* (2006.01)
*G02F 1/1335* (2006.01)
*G02B 5/30* (2006.01)

(52) U.S. Cl. .................... 536/69; 252/299.01; 349/96; 359/483

(58) Field of Classification Search ................. 536/69; 252/299.01; 349/96; 359/483
See application file for complete search history.

(56) References Cited

U.S. PATENT DOCUMENTS 5,472,538 A * 12/1995 Minakuchi et al. ........... 156/85
6,064,457 A    5/2000  Aminaka

FOREIGN PATENT DOCUMENTS

| EP | 926533 A2 | 6/1999 |
|---|---|---|
| JP | 09-222600 A | 8/1997 |
| JP | 10-045950 A | 2/1998 |
| JP | 11-005851 A | 1/1999 |
| JP | 11-198285 A | 7/1999 |
| JP | 2000-111914 A | 4/2000 |
| JP | 2000-275434 A | 10/2000 |
| JP | 2000-284124 A | 10/2000 |
| JP | 2000284124 A * | 10/2000 |
| JP | 2001-100039 A | 4/2001 |
| JP | 2001-114914 A | 4/2001 |
| JP | 2001-188128 A | 7/2001 |
| JP | 2001-249223 A | 9/2001 |
| JP | 2001-318228 A | 11/2001 |

* cited by examiner

*Primary Examiner*—James O. Wilson
*Assistant Examiner*—Everett White
(74) *Attorney, Agent, or Firm*—Buchanan Ingersoll PC

(57) ABSTRACT

A cellulose acetate film is made of a cellulose acetate having an acetic acid content of 59.0 to 61.5%. The film is controlled to have a Re retardation value in the range of 0 to 20 nm, a Rth retardation value in the range of 30 to 70 nm, and a thickness in the range of 10 to 70 nm.

19 Claims, No Drawings

CELLULOSE ACETATE FILM HAVING CONTROLLED RETARDATION AND THICKNESS

FIELD OF INVENTION

The present invention relates to a cellulose acetate film having controlled retardation and thickness, and further relates to a polarizing plate and a liquid crystal display employing that film.

BACKGROUND OF INVENTION

A liquid crystal display comprises a polarizing plate and a liquid crystal cell.

A TFT (thin film transistor) liquid crystal display of TN (twisted nematic) mode, which is mainly used, further comprises an optical compensatory film provided between the polarizing plate and the liquid crystal cell. As described in Japanese Patent Provisional Publication No. 8(1996)-50206, the optical compensatory film enables the display to give an image of high quality. However, on the other hand, the compensatory film makes the display thick.

Japanese Patent Provisional Publication No. 1(1989)-68940 discloses a liquid crystal display in which an optical compensatory sheet (phase retarder) is provided on one surface of the polarizing plate and an elliptically polarizing plate having a protective film is provided on the other surface. Because of this structure, the front contrast is improved without thickening the display. However, the optical compensatory sheet is often thermally distorted to change the phase retardation, so that a displayed dark image is framed with leaked light. Consequently, the display has poor durability.

In order to improve the durability without thickening the display, Japanese Patent Provisional Publication No. 7(1995)-191217 and European Patent No. 0,911,656A2 disclose that an optical compensatory sheet comprising a transparent support and a thereon-provided optically anisotropic layer comprising a discotic compound is directly adopted as a protective film on the polarizing plate. For forming the optically anisotropic layer, a coating solution comprising the discotic compound is applied on the support.

SUMMARY OF INVENTION

It is found that, in the case where a polarizing plate equipped with the conventional optical compensatory sheet as the protective film is attached on a large display panel of 17-inches or more, the framewise light leakage is not fully prevented. Surprisingly, even if a versatile polarizing plate is used, the framewise light leakage occurs to impair quality of the displayed image although it has not been hitherto observed.

Further, it is also found that, when attached on the large display panel, the polarizing plate is much distorted than when attached on a display panel of 15 inches or so, and consequently some cracks are often generated in a cellulose acetate film used as the protective film of the plate.

A first object of the present invention is to improve a cellulose acetate film used as a protective film of polarizing plate or as a support of optical compensatory sheet, and thereby to provide a cellulose acetate film excellent in preventing the framewise light leakage when used in a large liquid crystal display panel.

A second object of the invention is to provide a polarizing plate suitable for a large liquid crystal display panel.

A third object of the invention is to provide a large liquid crystal display panel giving an image of high quality.

The present inventors have studied and finally found that the light leakage is caused according to the following two mechanisms.

One cause of light leakage is change of temperature and humidity under which a liquid crystal display is left. In the liquid crystal display, a cellulose acetate film used in the polarizing plate or the optical compensatory sheet is fixed with adhesive on a polarizing membrane or a liquid crystal cell. When the temperature or humidity changes, the film expands or shrinks. The expansion or shrinkage is limited since the film is fixed, and accordingly the optical characters of the film are changed to leak light.

The other cause is thermal distribution in the cellulose acetate film given by heat generated at a backlight in the liquid crystal display. The thermal distribution thermally distorts the film, and accordingly changes the optical characters to leak light. It has been also found that a polymer having hydroxyl group such as cellulose acetate is particularly affected with the change of temperature and humidity.

In order to prevent the light leakage, it is desired to make the cellulose acetate film used in the polarizing plate or in the optical compensatory sheet less change the optical characters and to reduce the thermal distribution in the film.

It is found that the change of optical characters depends upon a product of photoelastic coefficient, thickness, virtual distortion caused by change of the environmental conditions, and modulus of elasticity of the cellulose acetate film. Accordingly, the light leakage can be remarkably reduced by lowering the photoelastic coefficient, by making the film thinner, by reducing the virtual distortion and by making the modulus of elasticity smaller. Further, if the thermal conductivity of the film is increased, the thermal distribution in the cellulose acetate film is lowered to reduce the light leakage.

Particularly when the polarizing plate is attached on a large liquid crystal display panel, it is expected for the cellulose acetate film to crack frequently. The inventors have found that "cracks" in the cellulose acetate film relate to bending strength of the film, and that "cracks" can be reduced if the film is made thinner.

According to the inventors' study, it is very effective in solving the aforementioned two problems (namely, the light leakage of liquid crystal display and the cracks of cellulose acetate film) to make the film thinner.

The present invention provides a cellulose acetate film comprising cellulose acetate having an acetic acid content of 59.0 to 61.5%, wherein the Re retardation value defined by the following formula (I) is in the range of 0 to 20 nm, the Rth retardation value defined by the following formula (II) is in the range of 30 to 70 nm, and the thickness is in the range of 10 to 70 μm:

$$Re=(nx-ny)\times d \quad (I)$$

$$Rth=\{(nx+ny)/2-nz\}\times d \quad (II)$$

[in which nx is a refractive index along the slow axis in the film plane, ny is a refractive index along the fast axis in the film plane, nz is a refractive index along the depth of the film, and d is the thickness of the film in terms of nm].

The invention also provides a polarizing plate comprising a pair of transparent protective films and a polarizing membrane provided between them, at least one of said protective films being a cellulose acetate film comprising cellulose acetate having an acetic acid content of 59.0 to 61.5%; wherein the cellulose acetate film has the Re retardation value defined by the above formula (I) in the range of 0 to 20 nm, the Rth retardation value defined by the above formula (II) in the range of 30 to 70 nm and a thickness in the range of 10 to 70 μm.

The invention further provides a liquid crystal display comprising a pair of polarizing plates and a liquid crystal cell placed between the plates, said polarizing plate comprising a pair of transparent protective films and a polarizing membrane provided between the films, and at least one of said protective films being a cellulose acetate film comprising cellulose acetate having an acetic acid content of 59.0 to 61.5%; wherein the cellulose acetate film has the Re retardation value defined by the above formula (I) in the range of 0 to 20 nm, the Rth retardation value defined by the above formula (II) in the range of 30 to 70 nm and a thickness in the range of 10 to 70 μm.

In the present specification, the term "essentially parallel" means the noticed angle is in the range of the strict angle ±5°. This angle allowance is preferably less than ±4°, more preferably less than ±3°, most preferably less than ±2°. The terms "slow axis", "fast axis" and "transmission axis" mean the directions giving the maximum refractive index, the minimum refractive index and the maximum transmittance, respectively.

The inventors have succeeded in providing a cellulose acetate film very suitable for a protective film of the polarizing plate or for a support of the optical compensatory sheet used in a large liquid crystal display. If the cellulose acetate film of the invention is used as a protective film of the polarizing plate or as a support of the optical compensatory sheet, the large liquid crystal display is prevented from leaking light and at the same time the cellulose acetate film is prevented from cracking in producing the liquid crystal display.

In the present invention, the cellulose acetate film is made thin enough to prevent the light leakage and the cracks. If the film is made thinner, its optical characters are generally changed. However, if only the cellulose acetate film is made thin, the resultant polarizing plate or optical compensatory sheet cannot have satisfying optical characters although the light leakage is prevented. In the invention, the cellulose acetate film is made thin while the conventional optical characters are maintained. As a result, the invention provides an excellent cellulose acetate film which keeps conventional optical characters and whose thickness is thin enough to prevent the light leakage.

The invention also provides a polarizing plate and an optical compensatory sheet comprising the cellulose acetate film of the invention. If only the polarizing plate or the optical compensatory sheet of the invention is installed instead of a conventional plate or sheet, a liquid crystal display can be easily enlarged without causing troubles (such as the light leakage). Further, since the cellulose acetate film of the invention is thinner than a conventional film, the polarizing plate and the optical compensatory sheet can be made thinner.

The cellulose acetate film of the invention or the polarizing plate whose protective film is an optical compensatory sheet comprising the cellulose acetate film of the invention as a support can be advantageously used in any liquid crystal display having a polarizing plate such as a display of TN (twisted nematic) mode, VA (vertical alignment) mode, IPS (in-plane switching) mode or OCB (optical compensate bend) mode.

DETAILED DESCRIPTION OF INVENTION (Prevention of Light Leakage)

In order to prevent the liquid crystal display from leaking light, the cellulose acetate film of the invention is controlled to have a thickness of 10 to 70 μm. The thickness is preferably in the range of 20 to 60 μm, more preferably in the range of 30 to 50 μm.

The cellulose acetate film preferably has a photoelastic coefficient of $1.0 \times 10^{-6}$ cm$^2$/kg or less. The cellulose acetate film has a modulus of elasticity preferably in the range of 3,000 Mpa or less, more preferably in the range of 2,500 Mpa or less. For reducing the virtual distortion of the cellulose acetate film, the film is preferably stretched biaxially to align the polymer molecules. Otherwise, it is also preferred to control the film to have a moisture swelling coefficient of $30 \times 10^{-5}$/% RH or less. The moisture swelling coefficient is more preferably $15 \times 10^{-5}$/% RH or less, most preferably $10 \times 10^{-5}$/% RH or less. The moisture swelling coefficient indicates how long the sample expands when the relative humidity increases under a constant temperature. The cellulose acetate film preferably has a thermal conductivity of 1 W/(m·K) or more, to ensure an even thermal distribution.

The bending strength of the film measured by means of a MIT bending tester is preferably 250 times or more, more preferably 300 times or more, so as to prevent the film from cracking when attached on a display panel. If the film is made thin, the bending strength is enhanced.

(Retardation of Film)

Retardation values Re and Rth of the film are defined by the following formulas (I) and (II):

$$Re = (nx - ny) \times d \quad (I)$$

$$Rth = \{(nx + ny)/2 - nz\} \times d \quad (II)$$

In the formulas (I) and (II), nx is a refractive index along the slow axis (i.e., along the direction giving the maximum refractive index) in the film plane.

In the formulas (I) and (II), ny is a refractive index along the fast axis (i.e., along the direction giving the minimum refractive index) in the film plane.

In the formula (II), nz is a refractive index along the thickness direction of the film.

In the formulas (I) and (II), d is a thickness of the film in terms of nm.

In the invention, the values Re and Rth are controlled in the ranges of 0 to 20 nm and 30 to 70 nm, respectively. The Rth value is controlled preferably in the range of 35 to 60 nm, more preferably in the range of 40 to 50 nm.

As described above, it is very important to make the cellulose acetate film thin so as to prevent the light leakage of the display and the cracks of the film.

However, if only a conventional cellulose acetate film is made thinner, the optical characters (e.g., Re and Rth values) of the film are changed although the problems such as the light leakage may be solved. As a result, the resultant polarizing plate or optical compensatory sheet has poor optical characters.

For example, if only a cellulose acetate film used as a protective film of conventional polarizing plate is made thin, the problems such as the light leakage can be solved but other problems such as reduction of viewing angle are caused. If such polarizing plate is installed in an optical compensatory sheet, the sheet cannot enlarge the viewing angle.

Accordingly, in the invention, the film is made thin while the retardation of the film is controlled in the above range. The thus controlled film of the invention can solve the problems such as the light leakage with the optical characters maintained. It is described below in detail how the retardation of the film is controlled.

The cellulose acetate film preferably has a birefringence value (Dn: nx−ny) in the range of 0.00 to 0.002. The film preferably has a birefringence value along the thickness direction {(nx+ny)/2−nz} in the range of 0.001 to 0.04.

(Cellulose Acetate)

In the invention, a cellulose acetate having an acetic acid content of 59.0 to 61.5% is used.

The term "acetic acid content" means the amount of combined acetic acid per one unit weight of cellulose. The acetic acid content is determined according to ASTM: D-817-91 (tests of cellulose acetate).

The film of the invention is made of a cellulose acetate having a viscosity average polymerization degree (DP) of preferably 250 or more, more preferably 290 or more.

Further, it is also preferred for the cellulose acetate to have a narrow molecular weight distribution of Mw/Mn (Mw and Mn are weight and number average molecular weights, respectively) determined by gel permeation chromatography. The value of Mw/Mn is preferably in the range of 1.0 to 1.7, more preferably in the range of 1.3 to 1.65, most preferably in the range of 1.4 to 1.6.

(Retardation Increasing Agent)

For adjusting the retardation of the cellulose acetate film, an aromatic compound having at least two aromatic rings is used as a retardation increasing agent.

The aromatic compound is used in an amount of preferably 0.01 to 20 weight parts, more preferably 0.05 to 15 weight parts, further preferably 0.1 to 10 weight parts, most preferably 0.5 to 5 weight parts based on 100 weight parts of cellulose acetate.

Two or more aromatic compounds may be used in combination. The aromatic ring may be either an aromatic hydrocarbon ring or an aromatic heterocyclic ring.

As the aromatic hydrocarbon ring, a six-membered ring (namely, a benzene ring) is particularly preferred.

The aromatic heterocyclic ring is generally unsaturated. The aromatic heterocyclic ring is preferably a five-, six- or seven-membered ring, and more preferably a five- or six-membered ring. The aromatic heterocyclic ring generally has double bonds as many as possible. The hetero-atom in the ring preferably is nitrogen atom, sulfur atom or oxygen atom, and more preferably is nitrogen atom. Examples of the aromatic heterocyclic ring include furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring and 1,3,5-triazine ring.

Preferred aromatic rings are benzene ring, furan ring, thiophene ring, pyrrole ring, oxazole ring, thiazole ring, imidazole ring, triazole ring, pyridine ring, pyrimidine ring, pyrazine ring and 1,3,5-triazine ring. Benzene ring and 1,3,5-triazine ring are more preferred.

The aromatic compound preferably contains at least one 1,3,5-triazine ring.

The number of aromatic rings in the aromatic compound is preferably in the range of 2 to 20, more preferably in the range of 2 to 12, further preferably in the range of 2 to 8, and most preferably in the range of 2 to 6.

The relation of the two or more aromatic rings is categorized into three cases, namely (a) the case in which the aromatic rings form a condensed ring, (b) the case in which the aromatic rings are connected through a single bond, and (c) the case in which the aromatic rings are connected through a linking group. [In this case, a spiro-bonding is not formed because the rings are aromatic.]

The relation of the aromatic rings may be any of the cases (a) to (c).

Examples of the condensed ring in the case (a) include indene ring, naphthalene ring, azulene ring, fluorene ring, phenanthrene ring, anthracene ring, acenaphthylene ring, naphthacene ring, pyrene ring, indole ring, isoindole ring, benzofuran ring, benzothiophene ring, indolizine ring, benzoxazole ring, benzothiazole ring, benzimidazole ring, benztriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxthine ring, phenoxazine ring and thianthrene ring. Preferred are naphthalene ring, azulene ring, indole ring, benzoxazole ring, benzothiazole ring, benzimidazole ring, benztriazole ring and quinoline ring.

The single bond in the case (b) is preferably between carbon atoms of the two aromatic rings. Two or more single bonds may connect the two aromatic rings to form an aliphatic ring or a non-aromatic ring between them.

The linking group in the case (c) is also preferably between carbon atoms of the two aromatic rings. The linking group is preferably an alkylene group, an alkenylene group, an alkynylene group, —CO—, —O—, —NH—, —S— and a combination thereof.

Examples of the linking group formed by the combination are shown below. In each of the following examples, the right and left terminals may be reversed.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the linking group may have substituent groups.

Examples of the substituent group include halogen atoms (F, Cl, Br, I), hydroxyl, carboxyl, cyano, amino, nitro, sulfo, carbamoyl, sulfamoyl, ureido, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfoneamide group, an aliphatic substituted amine group, an aliphatic substituted carbamoyl group, an aliphatic substituted sulfamoyl group, an aliphatic substituted ureido group and a non-aromatic heterocyclic group.

The alkyl group preferably has 1 to 8 carbon atoms. A chain alkyl group is preferred to a cyclic one, and a straight chain alkyl group is particularly preferred. The alkyl group may further have a susbstituent group (e.g., hydroxyl, carboxyl, an alkoxy group, an alkyl-substituted amino group). Examples of the (substituted) alkyl group include methyl, ethyl, n-butyl, n-hexyl, 2-hydroxyethyl, 4-carboxybutyl, 2-methoxyethyl and 2-diethylaminoethyl.

The alkenyl group preferably has 2 to 8 carbon atoms. A chain alkenyl group is preferred to a cyclic one, and a straight chain alkenyl group is particularly preferred. The alkenyl group may further have a susbstituent group. Examples of the alkenyl group include vinyl, allyl and 1-hexenyl.

The alkynyl group preferably has 2 to 8 carbon atoms. A chain alkynyl group is preferred to a cyclic one, and a straight chain alkynyl group is particularly preferred. The alkynyl group may further have a susbstituent group. Examples of the alkynyl group include ethynyl, 1-butynyl and 1-hexynyl.

The aliphatic acyl group preferably has 1 to 10 carbon atoms. Examples of the aliphatic acyl group include acetyl, propanoyl and butanoyl.

The aliphatic acyloxy group preferably has 1 to 10 carbon atoms. Examples of the aliphatic acyloxy group include acetoxy.

The alkoxy group preferably has 1 to 8 carbon atoms. The alkoxy group may further have a susbstituent group (e.g., another alkoxy group). Examples of the (substituted) alkoxy group include methoxy, ethoxy, butoxy and methoxyethoxy.

The alkoxycarbonyl group preferably has 2 to 10 carbon atoms. Examples of the alkoxycarbonyl group include methoxycarbonyl and ethoxycarbonyl.

The alkoxycarbonylamino group preferably has 2 to 10 carbon atoms. Examples of the alkoxycarbonylamino group include methoxycarbonylamino and ethoxycarbonylamino.

The alkylthio group preferably has 1 to 12 carbon atoms. Examples of the alkylthio group include methylthio, ethylthio and octylthio.

The alkylsulfonyl group preferably has 1 to 8 carbon atoms. Examples of the alkylsulfonyl group include methanesulfonyl and ethanesulfonyl.

The aliphatic amide group preferably has 1 to 10 carbon atoms. Examples of the aliphatic amide group include acetoamide The aliphatic sulfoneamide group preferably has 1 to 8 carbon atoms. Examples of the aliphatic sulfoneamide group include methanesulfoneamide, butanesulfoneamide and n-octanesulfoneamide.

The aliphatic substituted amine group preferably has 1 to 10 carbon atoms. Examples of the aliphatic substituted amine group include dimethylamino, diethylamino and 2-carboxyethyl amino.

The aliphatic substituted carbamoyl group preferably has 2 to 10 carbon atoms. Examples of the aliphatic substituted carbamoyl group include methylcarbamoyl and diethylcarbamoyl.

The aliphatic substituted sulfamoyl group preferably has 1 to 8 carbon atoms. Examples of the aliphatic substituted sulfamoyl group include methylsulfamoyl and diethylsulfamoyl.

The aliphatic substituted ureido group preferably has 2 to 10 carbon atoms. Examples of the aliphatic substituted ureido group include methylureido.

Examples of the non-aromatic heterocyclic group include piperidino and morpholino.

The retardation increasing agent has a molecular weight of 300 to 800.

Concrete examples of the retardation increasing agent are described in Japanese Patent Provisional Publication Nos. 2000-111014, 2000-275434 and PCT/JP 00/02619.

(Production of Cellulose Acetate Film)

The cellulose acetate film is prepared preferably according to a solution-film formation, particularly according to a solvent casting method in which an organic solvent is used in the solvent. The solvent casting method comprises the steps of dissolving cellulose acetate in the organic solvent to prepare a solution (dope) and casting the dope to prepare a film.

The organic solvent is preferably selected from the group consisting of an ether having 3 to 12 carbon atoms, a ketone having 3 to 12 carbon atoms, an ester having 3 to 12 carbon atoms and a halogenated hydrocarbon having 1 to 6 carbon atoms.

The ether, ketone and ester may have a cyclic structure. A compound having two or more functional groups of the ether (—O—), ketone (—CO—) and ester (—COO—) can also be used as the organic solvent. The organic solvent can have another functional group such as alcoholic hydroxyl. In the case where the organic solvent has two or more functional group, the number of the carbon atoms is defined as a compound having one functional group, which is optionally selected from the aforementioned group of the organic solvents.

Examples of the ethers having 3 to 12 carbon atoms include diisopropyl ether, dimethoxymethane, dimethoxyethane, 1,4-dioxane, 1,3-dioxolane, tetrahydrofuran, anisole and phenetol.

Examples of the ketones having 3 to 12 carbon atom include acetone, methyl ethyl ketone, diethyl ketone, diisobutyl ketone, cyclohexanone and methylcyclohexanone.

Examples of the esters having 3 to 12 carbon atoms include ethyl formate, propyl formate, pentyl formate, methyl acetate, ethyl acetate and pentyl acetate.

Examples of the compounds having two or more kinds of functional groups include 2-ethoxyethyl acetate, 2-methoxyethanol and 2-butoxyethanol.

The halogenated hydrocarbon preferably has one or two carbon atoms, and more preferably has one carbon atom. The halogen atom of the halogenated hydrocarbon preferably is chlorine. The ratio of the substitution of hydrogen with halogen is preferably in the range of 25 to 75 mole %, more preferably in the range of 30 to 70 mole %, further preferably in the range of 35 to 65 mole %, and most preferably in the range of 40 to 60 mole %. Methylene chloride is a representative halogenated hydrocarbon.

Two or more organic solvents can be used in combination.

A cellulose acetate solution can be prepared according to a conventional method. The conventional method means that the solution is prepared at a temperature of not lower than 0° C. (ordinary or elevated temperature). The preparation of the solution can be conducted by using a process and apparatus for preparation of a dope in a conventional solvent casting method. The conventional method preferably uses a halogenated hydrocarbon (particularly methylene chloride) as an organic solvent.

The amount of the polymer is so adjusted that a prepared solution contains cellulose ester in an amount of 10 to 40 wt. %. The amount of cellulose ester more preferably is 10 to 30 wt. %. An optional additive (described below) can be added to the organic (main) solvent.

The solution can be prepared by stirring cellulose acetate and an organic solvent at an ordinary temperature (0 to 40°

C.). A solution of a high concentration may be prepared by stirring them at an elevated temperature and at a high pressure. In that case, the polymer and the organic solvent are placed in a closed vessel, and are stirred at an elevated temperature and at a high pressure. The temperature is set to be higher than the boiling point at atmospheric pressure but lower than the boiling point of the solvent at the high pressure. In concrete, the heating temperature is usually not lower than 40° C., preferably in the range of 60 to 200° C., and more preferably in the range of 80 to 110° C.

The components can be preliminary dispersed coarsely, and the coarse dispersion can be placed in the vessel. Otherwise, the components can also be introduced into the vessel in series. The vessel should be equipped with a stirring device. A pressure in the vessel can be formed by introducing an inert gas such as nitrogen gas into the vessel, or by heating and evaporating the solvent to increase the vapor pressure. Otherwise, the components can be added to the vessel at a high pressure after the vessel is sealed.

The vessel is preferably heated outside. For example, the vessel can be heated with a jacket type heating apparatus. Further, a plate heater can be placed outside the vessel. Furthermore, a heated liquid can be circulated in a tube outside the vessel.

The components are stirred preferably with a stirring wing placed in the vessel. The stirring wing has such a length that the end of the wing reaches the wall of the vessel. A scratching tip is preferably attached to the end of the stirring wing to scratch and renew the solution remaining on the inside wall of the vessel.

The vessel can have a meter such as a manometer or a thermometer. The components are dissolved in the solvent in the vessel. The prepared dope is cooled in the vessel, or the dope is cooled after it is taken out of the vessel. The dope can be cooled by a heat exchanger.

The solution can be also prepared according to a cooling dissolution method. According to the cooling dissolution method, the cellulose acetate can be dissolved even in organic solvents in which it cannot be dissolved according to a conventional method. Further, if organic solvents in which the cellulose acetate can be dissolved according to a conventional method are used, the cooling dissolution method can prepare a solution more quickly.

At the first stage of the cooling dissolution method, the cellulose acetate is gradually added to an organic solvent while stirring at room temperature.

The amount of cellulose acetate is in the range of 10 to 40 wt. % based on the amount of the mixture, and is preferably in the range of 10 to 30 wt. %. An optional additive (described below) may be added to the mixture.

At the next stage, the mixture is cooled to a temperature of −100 to −10° C., preferably −80 to −10° C., more preferably −50 to −20° C., and most preferably −50 to −30° C. The mixture can be cooled in a dry ice/methanol bath (−75° C.) or in a cooled diethylene glycol solution (−30 to −20° C.). At the cooling stage, the mixture of the cellulose acetate and the solvent generally solidify.

The cooling rate is preferably faster than 4° C. per minute, more preferably faster than 8° C. per minute, and most preferably faster than 12° C. per minute. The cooling rate is preferably as fast as possible. However, a theoretical upper limit of the cooling rate is 10,000° C. per second, a technical upper limit is 1,000° C. per second, and a practical upper limit is 100° C. per second. The cooling rate means the change of temperature at the cooling stage per the time taken to complete the cooling stage. The change of temperature means the difference between the temperature at which the cooling stage is started and the temperature at which the cooling stage is completed.

The solidified mixture is warmed to a temperature of 0 to 200° C., preferably 0 to 150° C., more preferably 0 to 120° C., and most preferably 0 to 50° C. to dissolve the cellulose acetate in the solvent. The mixture can be warmed by leaving it at room temperature or on a hot bath.

The warming rate is preferably faster than 4° C. per minute, more preferably faster than 8° C. per minute, and most preferably faster than 12° C. per minute. The warming rate is preferably fast as possible. However, a theoretical upper limit of the warming rate is 10,000° C. per second, a technical upper limit is 1,000° C. per second, and a practical upper limit is 100° C. per second. The warming rate means the change of temperature at the warming stage per the time taken to complete the warming stage. The change of temperature means the difference between the temperature at which the warming stage is started and the temperature at which the warming stage is completed.

Thus a dope is formed as a uniform solution. If the cellulose acetate is not sufficiently dissolved, the cooling and warming steps can be repeated. The dope is observed with eyes to determine whether the cellulose acetate is sufficiently dissolved or not.

A sealed vessel is preferably used in the cooling dissolution method to prevent contamination of water, which is caused by dew condensation at the cooling step. The time for the cooling and warming stages can be shortened by conducting the cooling step at a high pressure and by conducting the warming step at a low pressure. A pressure vessel is preferably used at a high or low pressure.

In the case where the cellulose acetate (acetic acid content: 60.9%, viscosity average degree of polymerization: 299) is dissolved in methyl acetate by the cooling dissolution method to form 20 wt. % solution, the solution has a pseudo sol-gel phase transition point at about 33° C., which is measured by differential scanning calorimetric analysis (DSC). Under the transition point, the solution forms a uniform gel. Therefore, the solution should be stored at a temperature higher than the transition point, preferably at a temperature about 10° C. higher than the point. The pseudo sol-gel phase transition point depends on the combined average acetic acid content of cellulose acetate, the viscosity average degree of polymerization, the concentration of the dope and the nature of the solvent.

From the obtained cellulose acetate solution (dope), a cellulose acetate film is prepared according to a solvent casting method.

The dope is cast on a drum or a band, and then evaporated to form a polymer film.

Before casting the dope, the concentration of the dope is so adjusted that the solid content of the dope is in the range of 18 to 35 wt. %. The surface of the drum or band is preferably polished to give a mirror plane. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The drum or band preferably has a surface temperature of not higher than 10° C. when the dope is cast on the support. After casting the dope, the dope is preferably dried with flowing air for at least 2 seconds. The formed film is peeled off the drum or band, and the film can be further dried with hot air to remove the solvent remaining in the film. The temperature of the air can be gradually elevated from 100 to 160° C. The above-mentioned method is described in Japanese Patent Publication No. 5(1993)-17844. According to the method, the time for casting and peeling steps can be shortened. This method requires that the dope be set to gel at the surface temperature of the drum or band.

A film having two or more layers can be formed by simultaneously casting (co-casting) the dopes. Also in this case, the cellulose acetate film is preferably prepared according to the solvent cast method. The dopes are cast on a drum or a band, and then evaporated to form the film. Before casting the dopes, the concentration of each dope is so adjusted that the solid content is in the range of 10 to 40 wt. %. The surface of the drum or band is preferably polished to give a mirror plane.

In the case where two or more cellulose acetate solutions are used, the solutions may be cast from nozzles provided at intervals in the transferring direction of the support to form a layered film. This method is described in, for example, Japanese Patent Provisional Publication Nos. 61(1986)-158414, 1(1989)-122419 and 11(1999)-198285. The solutions may be simultaneously cast from two nozzles to form a layered film. This method is described in, for example, Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933.

The method described in Japanese Patent Provisional Publication No. 56(1981)-162617 can be also adopted. In that method, a highly viscous cellulose acetate solution is enclosed with a low viscous one, and then the thus-combined solutions are simultaneously extruded and cast.

Further, the method described in, for example, Japanese Patent Publication No. 44(1969)-20235 may be adopted. In the method, a film is beforehand formed from a solution extruded out of one of two nozzles. After the formed film is peeled and reversely placed on the support, another solution is extruded from the other nozzle to cast onto the film (on the surface having faced to the support) to form a layered film.

The cellulose acetate solutions may be the same or different from each other. Two or more cellulose acetate layers having different functions can be also formed by extruding the corresponding cellulose acetate solutions from the nozzles.

Further, the cellulose acetate solutions may be cast together with dopes for other functional layers (e.g., adhesive layer, dye layer, antistatic layer, anti-halation layer, ultraviolet-absorbing layer, polarizing layer).

In the case where a film consisting of a single layer is formed by the solvent casting method, it is necessary to extrude a dope of high concentration and high viscosity. That dope is generally so unstable that solid particles are often deposited and that the formed film often has poor evenness. If such viscous dope is extruded simultaneously from plural nozzles onto the support, a film having excellent evenness can be prepared. Further, since the thick dope is rapidly dried, the film can be rapidly produced.

A plasticizer can be added to the cellulose acetate film to improve the mechanical strength of the film. The plasticizer has another function of shortening the time for the drying process. Phosphoric esters and carboxylic esters are usually used as the plasticizer. Examples of the phosphoric esters include triphenyl phosphate (TPP) and tricresyl phosphate (TCP). Examples of the carboxylic esters include phthalic esters and citric esters. Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include triethyl o-acetylcitrate (OACTE) and tributyl o-acetylcitrate (OACTB). Examples of the other carboxylic esters include butyl oleate, methylacetyl ricinoleate, dibutyl sebacate and various trimellitic esters. Phthalic ester plasticizers (DMP, DEP, DBP, DOP, DPP, DEHP) are preferred. DEP and DPP are particularly preferred.

The amount of the plasticizer is preferably in the range of 0.1 to 25 wt. %, more preferably in the range of 1 to 20 wt. %, and most preferably in the range of 3 to 15 wt. % based on the amount of the cellulose acetate.

Deterioration inhibitors (e.g., antioxidizing agent, peroxide decomposer, radical inhibitor, metal inactivating agent, oxygen scavenger, amine) can be incorporated into the cellulose acetate film. The deterioration inhibitors are described in Japanese Patent Provisional Publication Nos. 3(1991)-199201, 5(1993)-1907073, 5(1993)-194789, 5(1993)-271471 and 6(1994)-107854. The deterioration inhibitor is preferably added in the range of 0.01 to 1 wt. %, and more preferably in the range of 0.01 to 0.2 wt. % based on the amount of the prepared solution (dope). If the amount is less than 0.01 wt. %, the effect of the deterioration inhibitor cannot be expected. If the amount is more than 1 wt. %, the inhibitor often bleeds out on the surface of the film. Butyrated hydroxytoluene (BHT) and tribenzylamine (TBA) are particularly preferred deterioration inhibitors.

(Highly Thermal Conductive Particles)

For improving thermal conductivity of the cellulose acetate film, various highly thermal conductive particles can be added to the film. The thermal conductive particles are preferably made of transparent material. Examples of the material include aluminum nitride, silicon nitride, boron nitride, magnesium nitride, silicon carbide, aluminum oxide, silicon oxide, zinc oxide, magnesium oxide, carbon (including diamond) and metals.

The amount of the thermal conductive particles is preferably in the range of 5 to 100 weight parts based on 100 weight parts of the cellulose acetate. If the amount is less than 5 weight parts, the thermal conductivity of the film is insufficiently improved. If it is more than 50 weight parts, it is difficult to produce the film and the produced film is liable to have poor strength.

The highly thermal conductive particles have a mean particle size preferably in the range of 0.05 to 80 μm, more preferably in the range of 0.1 to 10 μm. The particles may have either spherical shape or needle-like shape.

(Biaxial Stretching)

For reducing the virtual distortion, the film is preferably stretched. If the film is stretched, the virtual distortion along the stretching direction is reduced. Therefore, the stretching is preferably performed so that distortions in all the directions in plane may be evenly inhibited, and hence biaxial stretching is preferred.

In the biaxial stretching, the film is simultaneously or successively stretched in two directions (namely, simultaneous biaxial stretching or successive biaxial stretching). The successive biaxial stretching is preferred in consideration of continuous production. The process of the successive biaxial stretching comprises the steps of casting the dope, peeling the formed film from the band or drum, stretching the film laterally (perpendicularly to the casting direction), and then stretching the film longitudinally. The longitudinal stretching step may be performed prior to the lateral stretching.

Japanese Patent Provisional Publication Nos. 62(1987)-115035, 4(1992)-152125, 4(1992)-284211, 4(1992)-298310 and 11(1999)-48271 describe the lateral stretching, which is performed at room temperature or an elevated temperature. The elevated temperature is preferably below the glass transition temperature of the film. The film can be stretched while dried in the film production. Preferably, the film is stretched while the solvent still remains in the film. The longitudinal stretching can be performed, for example, by controlling the conveying rollers so that the speed of winding up the film may be faster than that of peeling the film. The lateral stretching, on the other hand, can be performed by gradually widening the interval between tenters clipping both sides of the conveyed film. Otherwise, after the film is dried, it can be stretched by means of a stretching machine (preferably, the film is monoaxially stretched by means of a long stretching machine). The expanding ratio of stretching (the ratio of length increased by stretching based on the original length) is preferably in the range of 3 to 50%, more preferably in the range of 5 to 30%, most preferably in the range of 8 to 20%.

The steps from casting to drying may be performed under air atmosphere or relatively inert atmosphere (e.g., nitrogen gas atmosphere). For winding up the film, generally used machines can be used. Examples of the winding method include constant tension method, constant torque method, taper tension method and programmed tension control method by which inner stress is kept constant.

(Moisture Swelling Coefficient)

The moisture swelling coefficient is determined by measuring the change of length of the sample when the relative humidity is changed with the temperature kept constant.

The cellulose acetate film has a moisture swelling coefficient of preferably $30 \times 10^{-5}$/% RH or less, more preferably $15 \times 10^{-5}$/% RH or less, most preferably $10 \times 10^{-5}$/% RH or less. The less the moisture swelling coefficient is, the more it is preferred. However, it is normally $1.0 \times 10^{-5}$/% RH or more.

The moisture swelling coefficient is determined in the following manner. First, the formed polymer film (phase retarder) is cut to prepare a sample (5 mm width ¥ 20 mm length). One of the ends of the sample is fixed, and the sample is suspended at 25∞C, 20% RH ($R_O$). At the other (free) end of the sample, a weight of 0.5 g is further suspended. After 10 minutes, the length of the sample ($L_0$) is measured. The humidity is then changed to 80% RH($R_1$) while the temperature is kept at 25∞C, and the length ($L_1$) is measured again. From the measured values, the moisture swelling coefficient is calculated according to the following formula. Ten samples are prepared from the same film, and the procedure is repeated. The calculated values are averaged to determine the moisture swelling coefficient.

Moisture swelling coefficient [/% $RH$]={($L_1-L_0$)/$L_0$}/($R_1-R_O$)

The less free volume the cellulose acetate film has, the less the size of the film is changed with moisture. The free volume depends upon the amount of remaining solvent used in film forming process. Accordingly, the less the solvent remains, the less the size changes.

For reducing the remaining solvent, the film is dried at a high temperature for long time. However, if too much time is spent for drying, the productivity is lowered. Accordingly, the amount of remaining solvent is preferably in the range of 0.01 to 1 wt. %, more preferably in the range of 0.02 to 0.07 wt. %, most preferably in the range of 0.03 to 0.05 wt. %.

The amount of remaining solvent is so controlled that the cellulose acetate film may be produced at a low cost with high productivity.

As another method for reducing the film-size change with moisture, a compound having hydrophobic groups is preferably added. Preferred examples of the hydrophobic groups include alkyl groups and phenyl. The compound is preferably selected from the aforementioned plasticizers or deterioration inhibitors. Examples of the compound include triphenyl phosphate (TPP) and tribenzylamine (TBA).

The amount of the compound having hydrophobic groups is preferably in the range of 0.01 to 10 wt. %, more preferably in the range of 0.1 to 5 wt. %, most preferably in the range of 1 to 3 wt. % based on the amount of the prepared solution (dope).

(Surface Treatment of Cellulose Acetate Film)

The cellulose acetate film is preferably subjected to a surface treatment. Examples of the surface treatment include corona discharge treatment, glow discharge treatment, flame treatment, alkali saponification treatment and ultraviolet (UV) treatment. In place of the surface treatment, an undercoating layer (described in Japanese Patent Provisional Publication No. 7(1995)-333433) may be provided.

The film after subjected to the surface treatment has a surface energy preferably in the range of not less than 55 mN/m, more preferably in the range of 60 to 75 mN/m.

For ensuring the evenness of the film, the surface treatment is preferably performed so that the temperature of the film may be not higher than Tg (glass transition temperature) of the film (namely, not higher than 150∞C).

When used as a protective film of polarizing plate, the cellulose acetate film is preferably subjected to acid or alkali treatment in consideration of adhesion onto the polarizing membrane. This means the cellulose acetate film is preferably subjected to saponification treatment.

The alkali saponification treatment can be cyclically performed through the steps of immersing the film in an alkaline solution, neutralizing with an acidic solution, washing with water and drying.

Examples of the alkaline solution include aqueous solutions of potassium hydroxide and sodium hydroxide. The normality of hydroxyl ion in the alkaline solution is preferably in the range of 0.1 to 3.0 N, more preferably in the range of 0.5 to 2.0 N. The alkaline solution is kept at a temperature preferably in the range of room temperature to 90° C., more preferably in the range of 40 to 70° C.

The surface energy can be measured by the contact angle method, the wet heating method or the adsorption method (these methods are described in 'The basic theory and application of wetting [written in Japanese]', published by Realize Co., Ltd, 1989). The contact angle method is preferred. In that method, two solutions having known surface energies are dropped onto the film. The contact angle of each drop is measured, and the surface energy of the film is calculated from the measured contact angles. The contact angle is, by definition, an angle (including the drop) between the film surface and the tangent of the drop surface at their crossing point.

(Optically Anisotropic Layer)

An optically anisotropic layer may be provided on the cellulose acetate film of the invention.

The optically anisotropic layer may be formed either by directly applying a coating solution on the cellulose acetate film or by laminating, with adhesive, the film of the invention and another film on which an optically anisotropic layer is beforehand prepared. Between the optically anisotropic layer and the cellulose acetate film, an orientation layer is preferably provided.

The thus-prepared optical compensatory sheet is placed between the polarizing plate and the liquid crystal cell in the liquid crystal display, so as to optically compensate the cell and to prevent the light leakage. The optical compensatory sheet may be used as a protective film of the polarizing plate in the liquid crystal display.

For preparing the optically anisotropic layer, a coating solution containing a liquid crystal compound and other optional components (such as polymerization initiator) is applied on the orientation layer.

The liquid crystal compound used in the optically anisotropic layer may be either rod-like or discotic one. The compound may be a polymer liquid crystal or a monomer liquid crystal of low molecular weight. Further, a polymer in which liquid crystal molecules of low molecular weight are crosslinked and hence which no longer behaves as liquid crystal is also usable. A discotic liquid crystal compound is most preferably used in the invention (Rod-Like Liquid Crystal Compound)

Examples of the rod-like liquid crystal compound include azomethines, azoxys, cyanobiphenyls, cyanophenyl esters, benzoic esters, phenyl esters of cyclohexanecarboxylates, cyanophenylcyclohexanes, cyano-substituted phenylpyrimidines, alkoxy-substituted phenylpyrimidines, phenyldioxanes, tolanes, and alkenylcyclohexylbenzonitriles.

Metal complexes are also included in the rod-like liquid crystal compounds. Further, a liquid crystal polymer in which the repeating unit comprises a rod-like liquid crystal moiety is also usable as the rod-like liquid crystal compound. In other words, the rod-like liquid crystal compound may be combined with a (liquid crystal) polymer.

Descriptions of the rod-like liquid crystal compounds are found in "Kagaku-Sosetsu, Ekisho no Kageku" (written in Japanese), vol. 22(1994), Chapters 4, 7 and 11; and "Ekisho Devise Handbook" (written in Japanese), chapter 3.

The rod-like liquid crystal compound preferably has a birefringent index of 0.001 to 0.7.

The molecule of the rod-like liquid crystal compound preferably has a polymerizable group (Q) to fix the alignment.

Examples of the polymerizable group (Q) are shown below.

 (Q1)

 (Q2)

 (Q3)

 (Q4)

 (Q5)

 (Q6)

 (Q7)

 (Q8)

 (Q9)

—SH (Q10)

—CHO (Q11)

—OH (Q12)

—CO$_2$H (Q13)

—N=C=O (Q14)

—NH$_2$ (Q15)

—SO$_3$H (Q16)

—N=C=S (Q17)

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

The rod-like liquid crystal molecule preferably has an almost symmetrical structure, and accordingly preferably has a polymerizable group at each end.

Examples of the rod-like liquid crystal molecule are shown below.

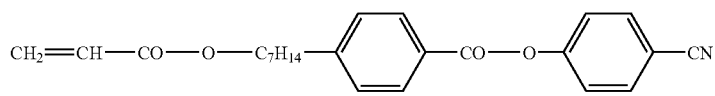 (N1)

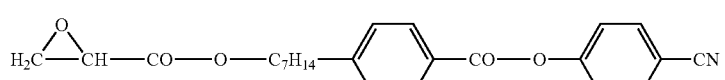 (N2)

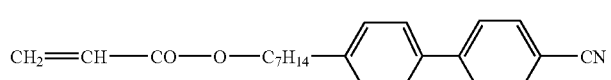 (N3)

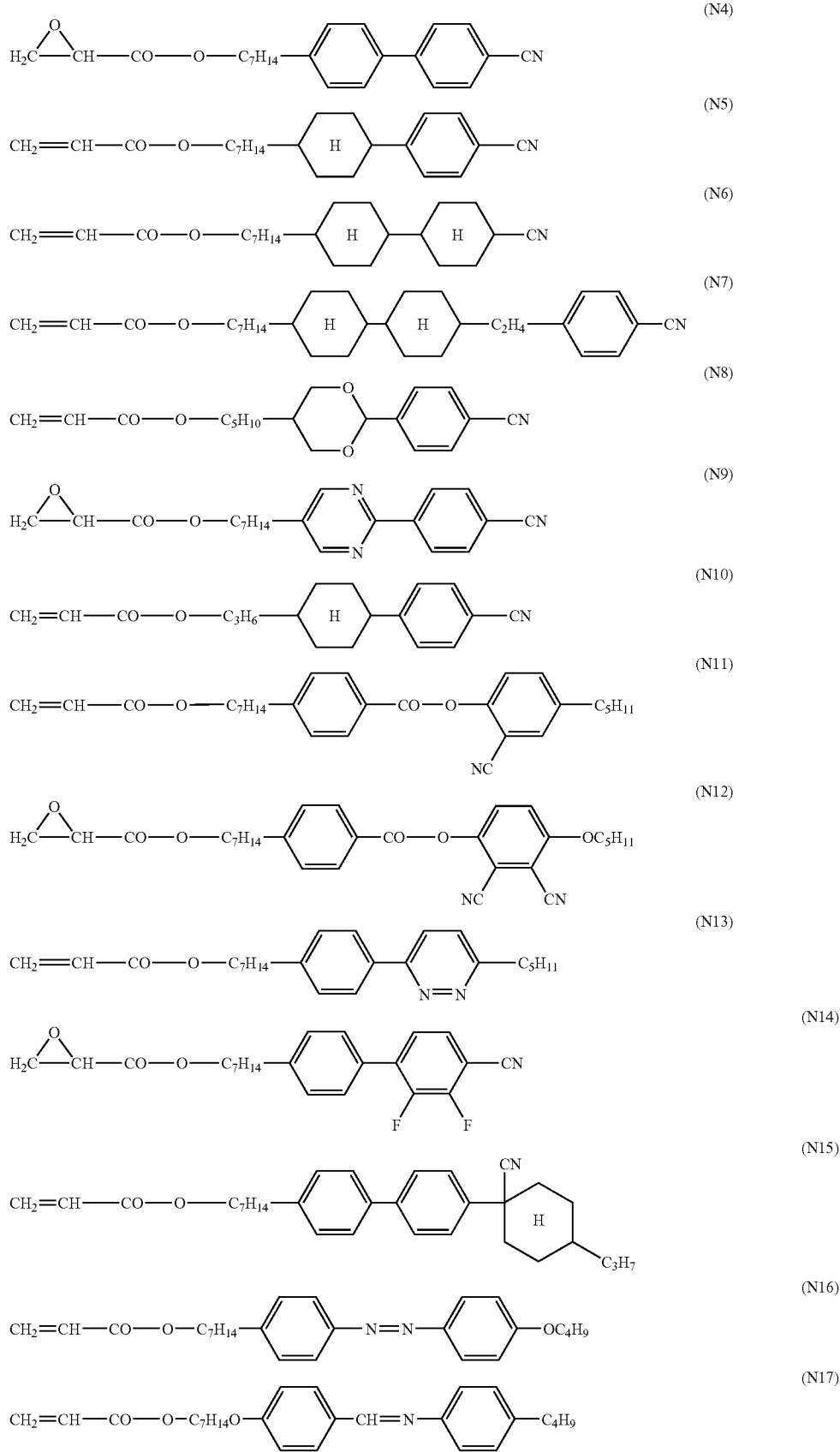

-continued
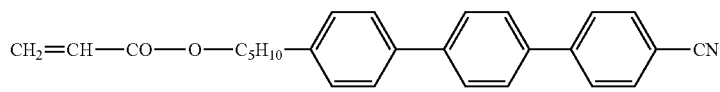 (N18)
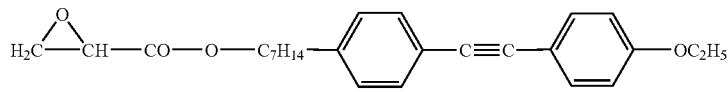 (N19)
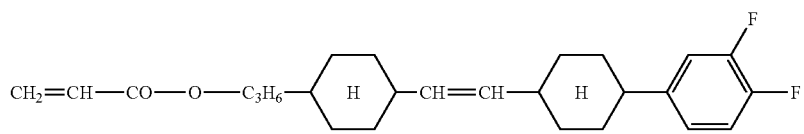 (N20)
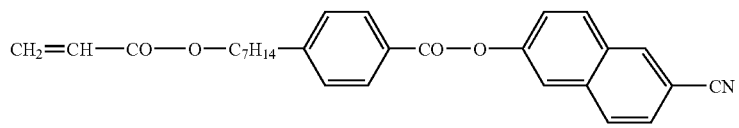 (N21)
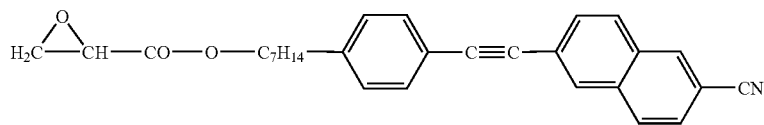 (N22)
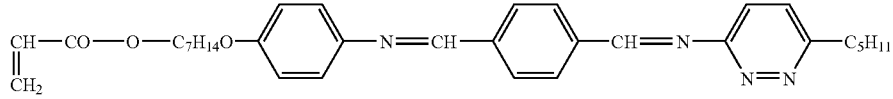 (N23)
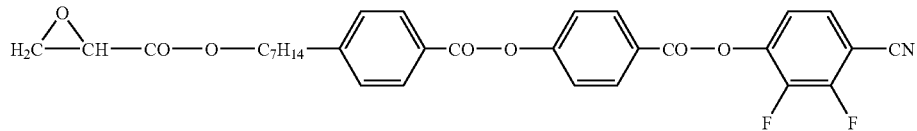 (N24)
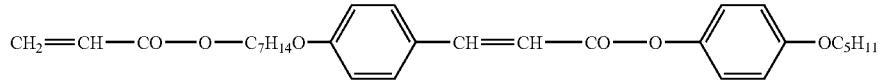 (N25)
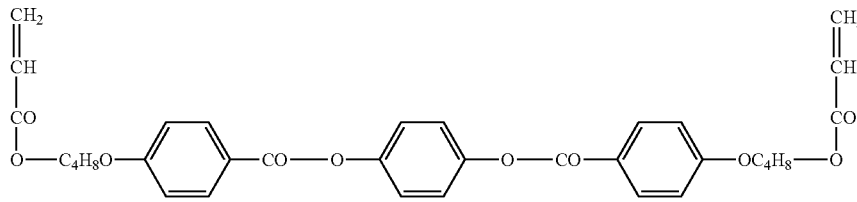 (N26)
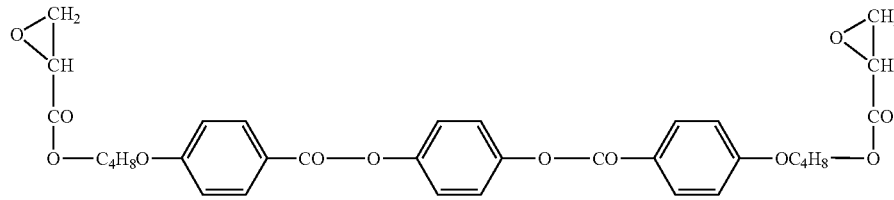 (N27)
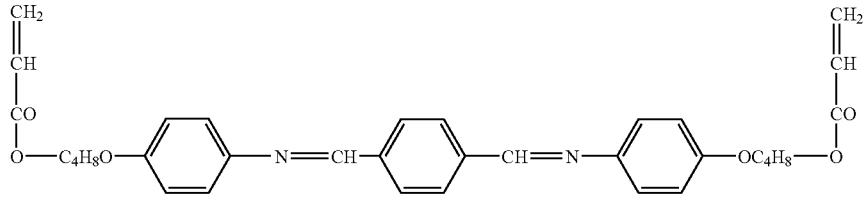 (N28)

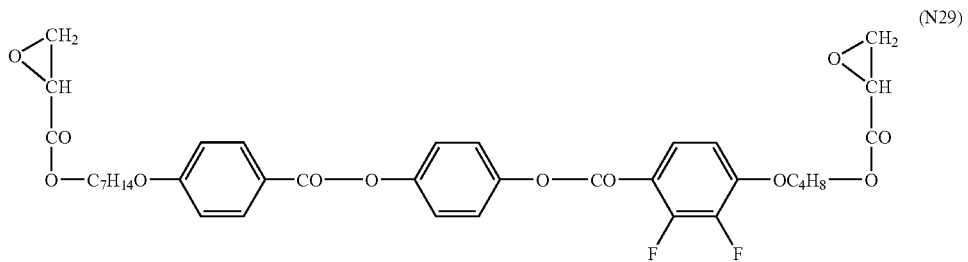
(N29)
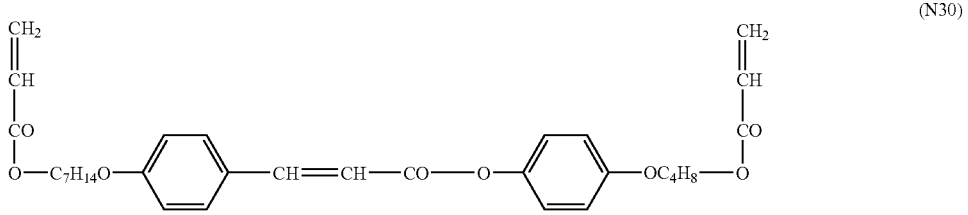
(N30)
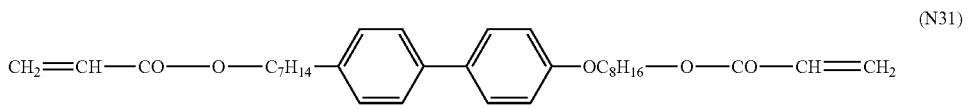
(N31)
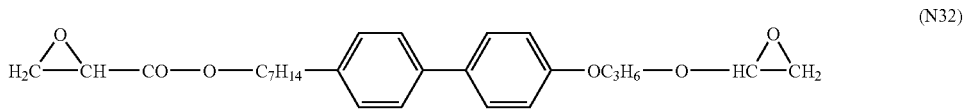
(N32)
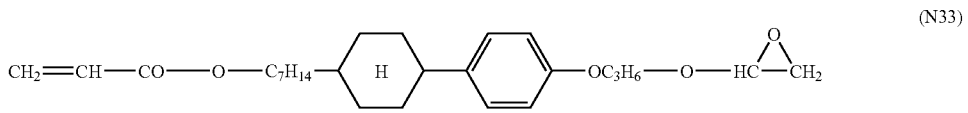
(N33)
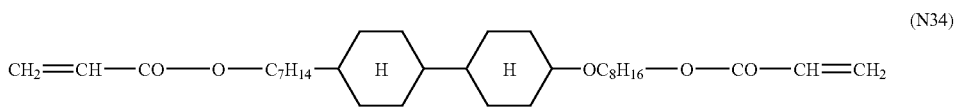
(N34)
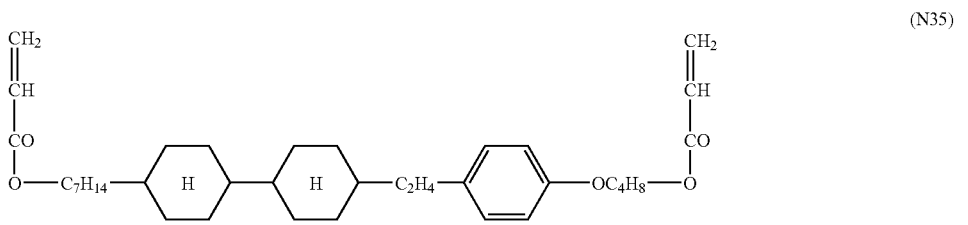
(N35)
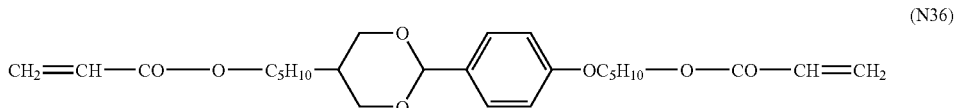
(N36)
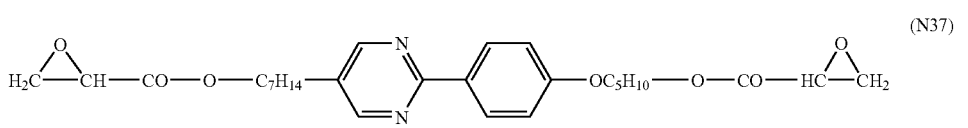
(N37)
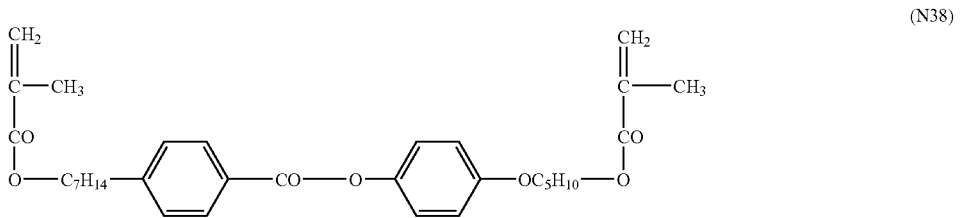
(N38)

-continued
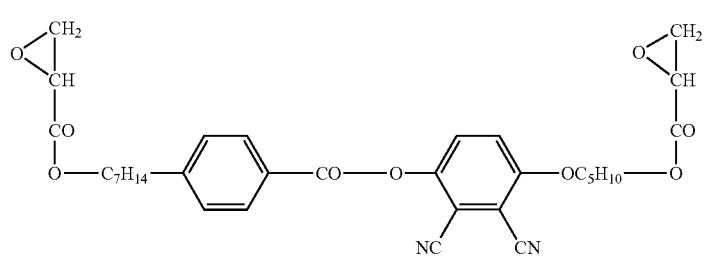 (N39)
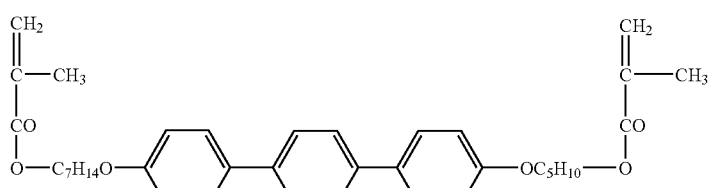 (N40)
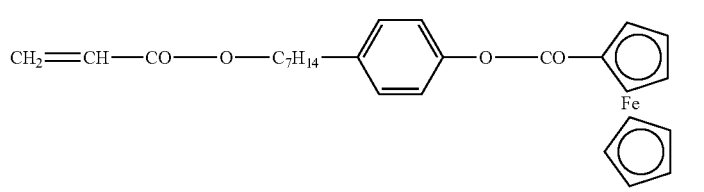 (N41)
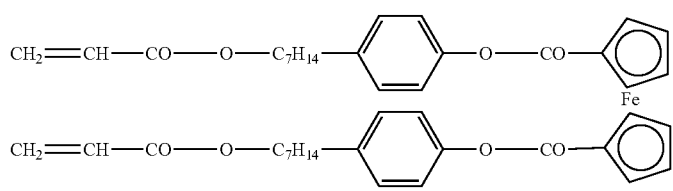 (N42)
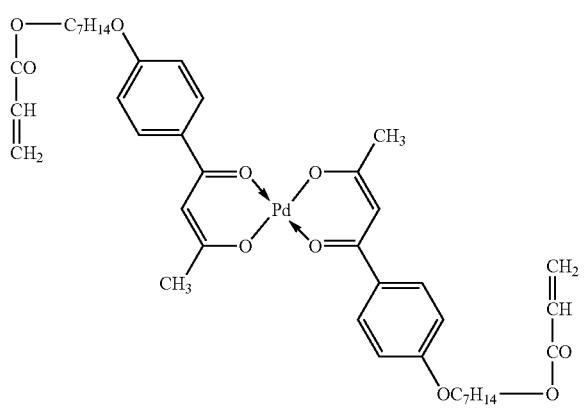 (N43)
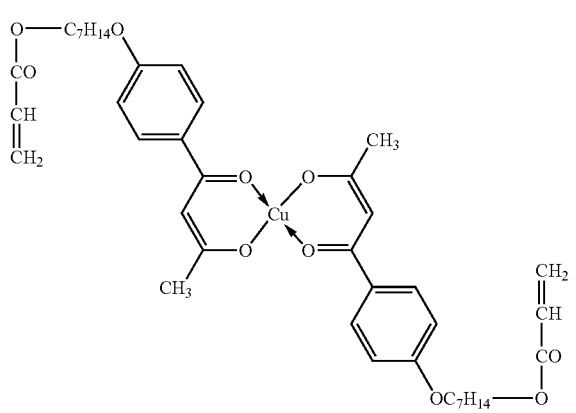 (N44)

-continued
(N45)
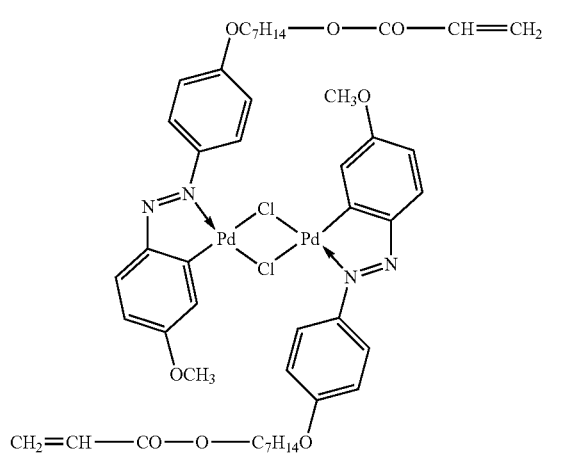
(N46)
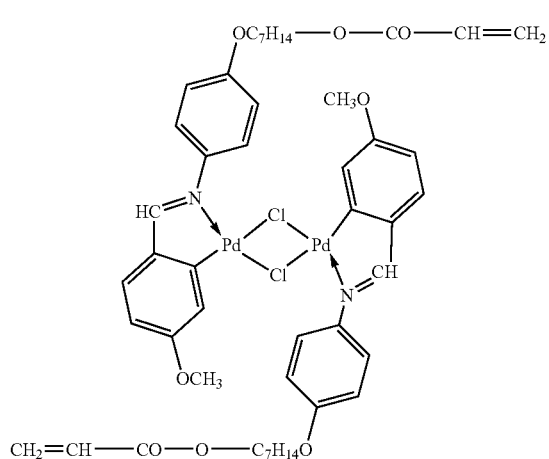
(N47)
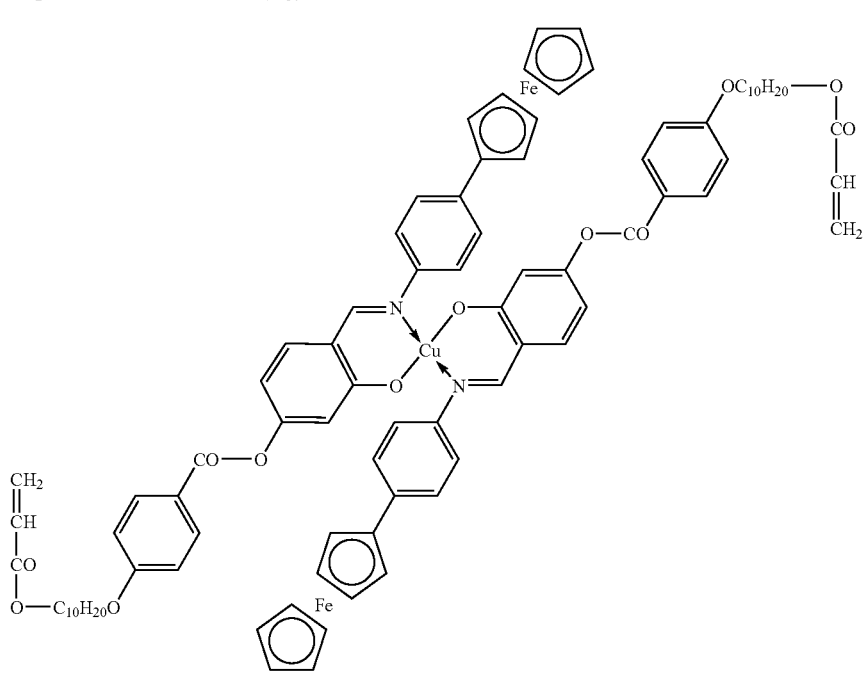

The optically anisotropic layer is prepared by coating the orientation layer with a liquid crystal composition (coating solution) containing the rod-like liquid crystal compound and other optional components such as polymerization initiator and additives (e.g., plasticizer, monomer, surface active agent, cellulose acetate, 1,3,5-triazine, chiral agent).

(Discotic Liquid Crystal Compound)

Examples of the discotic liquid crystal compound include benzene derivatives described in C. Destrade et al., Mol. Cryst. vol. 71, pp. 111, (1981); truxene derivatives described in C. Destrade et al., Mol Cryst. vol. 122, pp. 141. (1985), Physics lett. A, vol. 78, pp. 82, (1990); cyclohexane derivatives described in B. Kohn et al., Angew. Chem. vol. 96, pp. 70, (1984); and macrocyclic compounds of azacrown-type or phenylacetylene-type described in J. M. Lehn et al., J. Chem. Commun. pp. 1794, (1985), and J. Zhang et al., J. Am. Chem. Soc. vol. 116, pp. 2655, (1994).

The discotic compound has a structure in which the discotic structure unit is located at the center as a parent core and further straight chain groups such as alkyl, alkoxy and substituted benzoyl are radially substituted. The discotic compound generally has the properties of liquid crystal, and hence includes a compound generally called discotic liquid crystal. As the discotic liquid compounds, any compound can be used so long as it has negative uniaxial property and orientation property. Substance derived from the discotic compound is not always the above-described compound. For example, the low molecular weight discotic liquid crystal compound having a thermo- or photoreactive group is polymerized by heat or light to form a polymer that does not behave as liquid crystal. Such polymer can be also used in the invention. Preferred examples of the discotic liquid crystal compound are described in Japanese Patent Provisional Publication No. 8(1996)-50206. Japanese Patent Provisional Publication No. 8(1996)-27284 describes polymerization of the discotic liquid crystal compound.

A polymerizable group should be bound to a discotic core of the discotic compound to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic compound having a polymerizable group preferably is a compound represented by the following formula (III):

D(-L-Q)$_n$  (III)

in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q).

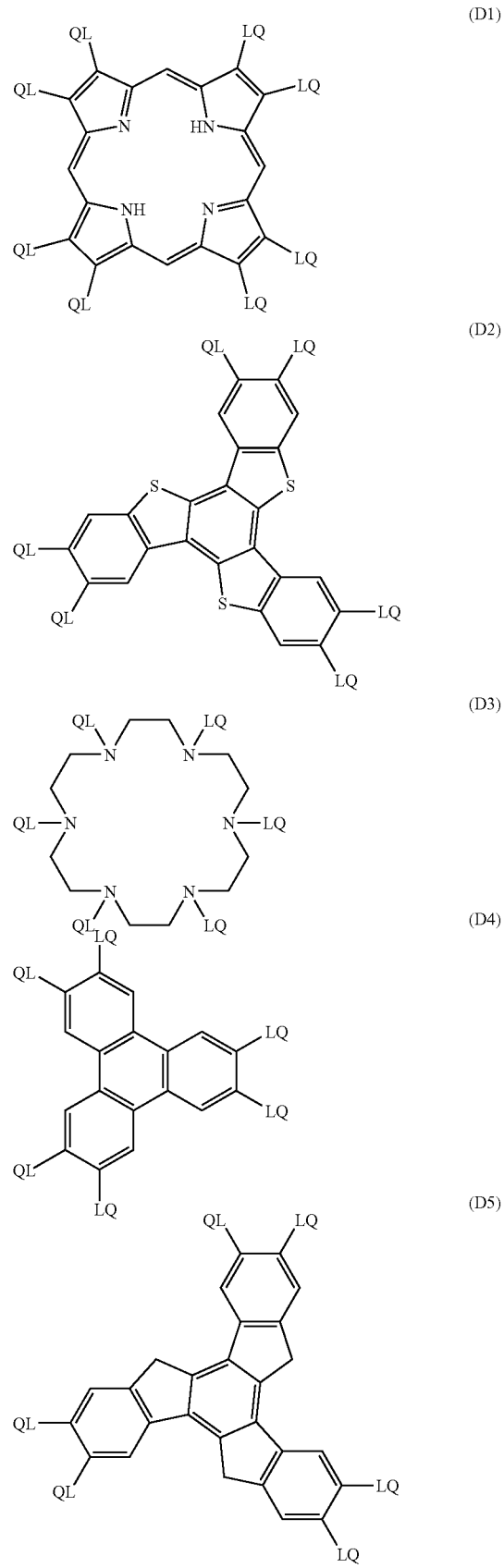

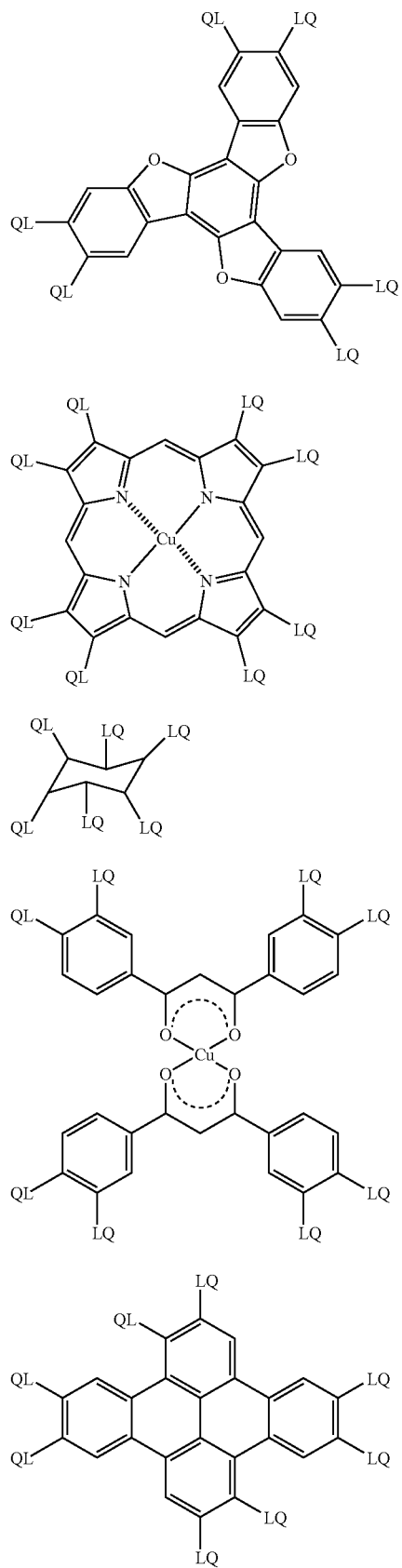
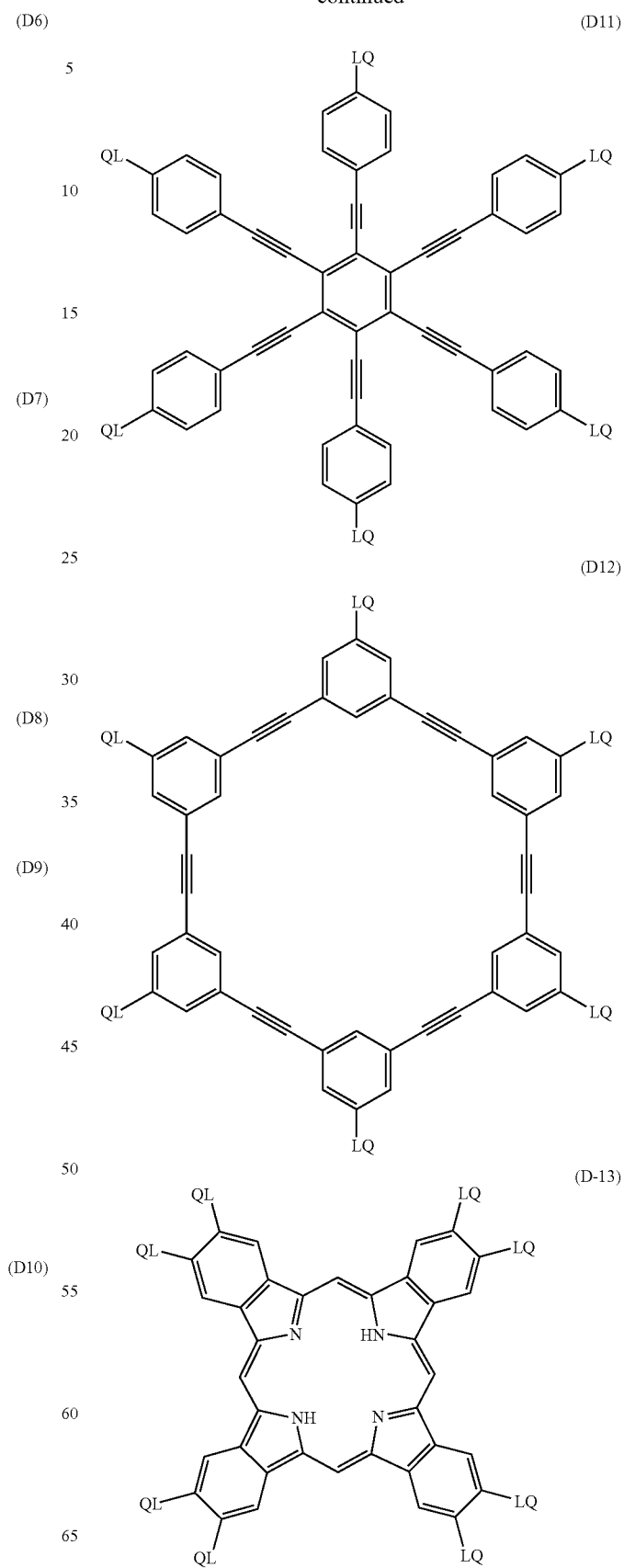

-continued

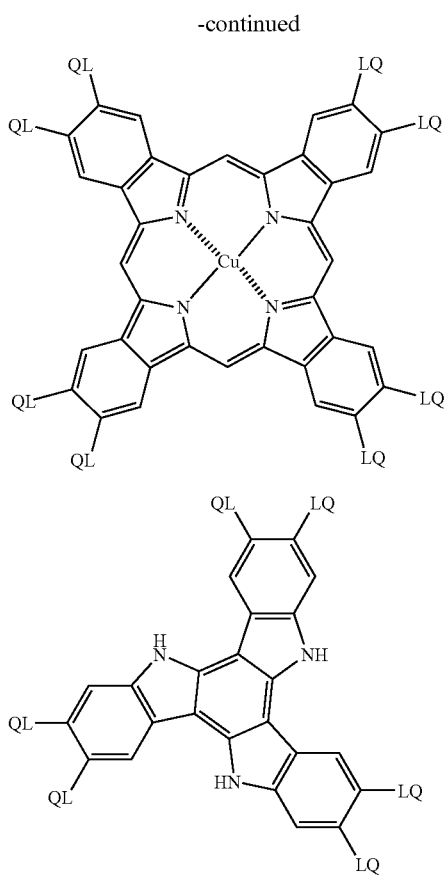

(D14)

(D15)

In the formula (III), the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an arylene group, —CO—, —NH—, —O— and —S—. L more preferably is a divalent linking group comprising at least two divalent groups selected from the group consisting of an alkylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms.

Examples of the divalent linking groups (L) are shown below. In the examples, the left side is attached to the discotic core (D), and the right side is attached to the polymerizable group (Q). The AL means an alkylene group or an alkenylene group. The AR means an arylene group. The alkylene group, the alkenylene group and the arylene group may have a substituent group (e.g., an alkyl group).

L1: -AL-CO—O-AL-
L2: -AL-CO—O-AL-O—
L3: -AL-CO—O-AL-O-AL-
L4: -AL-CO—O-AL-O—CO—
L5: —CO-AR-O-AL-
L6: —CO-AR-O-AL-O—
L7: —CO-AR-O-AL-O—CO—
L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AR-O-AL-CO—
L17: —O—CO-AR-O-AL-O—CO—
L18: —O—CO-AR-O-AL-O-AL-O—CO—
L19: —O—CO-AR-O-AL-O-AL-O-AL-O—CO—
L20: —S-AL-
L21: —S-AL-O—
L22: —S-AL-O—CO—
L23: —S-AL-S-AL-
L24: —S-AR-AL-

The polymerizable group (Q) in the formula (III) is determined according to the polymerization reaction. Examples of the polymerizable groups (Q) are the same as Q1 to Q17 shown above for rod-like liquid crystal compound.

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the formula (III), n is an integer of 4 to 12, which is determined according to the chemical structure of the discotic core (D). The 4 to 12 combinations of L and Q can be different from each other. However, the combinations are preferably identical.

If the discotic compound is used, the optically anisotropic layer shows negative birefringence. In that optically anisotropic layer, discotic structure units of the discotic compound preferably have planes inclined from a plane of the cellulose acetate film at an angle varying in (along) the direction of depth of the layer.

The above-described angle (inclined angle) of the plane of discotic structure unit generally increases or decreases with increase of distance in the direction of depth from the bottom of the optically anisotropic layer. The inclined angle preferably increases with increase of the distance. Further, examples of variation of the inclined angle include continuous increase, continuous decrease, intermittent increase, intermittent decrease, variation containing continuous increase and decrease, and intermittent variation containing increase or decrease. The intermittent variation contains an area where the inclined angle does not vary in the course of the thickness direction of the layer. The inclined angle preferably totally increases or decreases in the layer, even if it does not vary in the course. The inclined angle more preferably increases totally, and it is particularly preferred to increase continuously.

The inclined angle of the discotic unit near the support can be generally controlled by selecting the discotic compound or materials of the orientation layer, or by selecting methods for the rubbing treatment. The inclined angle of the discotic unit near the surface (air) can be generally controlled by selecting the discotic compound or other compounds used together with the discotic compound. Examples of the compounds used together with the discotic compound include plasticizer, surface active agent, polymerizable monomer and polymer. Further, the extent of variation of the inclined angle can be also controlled by the above selection.

Any compound can be employed as the plasticizer, the surface active agent and the polymerizable monomer, so long as it is compatible with the discotic compound and it gives variation of the inclined angle or dose not inhibit the discotic compound molecules from aligning. Preferred is polymerizable monomer (e.g., compounds having a vinyl, vinyloxy, acryloyl or methacryloyl group). Those compounds are preferably used in the amount of 1 to 50 wt. % (especially 5 to 30 wt. %) based on the amount of the discotic compound.

Any polymer can be used together with the discotic liquid crystal compound, so long as it is compatible with the discotic compound and it gives variation of the inclined angle. The polymer is, for example, cellulose ester. Preferred examples of the cellulose ester include cellulose acetate, cellulose acetatepropionate, hydrocypropylcellulose, and cellulose acetatebutylate. In order not to prevent molecules of the discotic compound from aligning, the amount of the polymer is generally in the range of 0.1 to 10 wt. %, preferably in the range of 0.1 to 8 wt. %, more preferably in the range of 0.1 to 5 wt. % based on the amount of the discotic compound.

The optically anisotropic layer can be generally prepared by the steps of coating the orientation layer with a solution of the discotic compound and other compounds dissolved in a solvent, drying, heating to a temperature for forming a discotic nematic phase, and cooling with the oriented condition (discotic nematic phase) kept. Otherwise, the layer can be prepared by the steps of coating the orientation layer with a solution of the discotic compound and other compounds (e.g., polymerizable monomer, photopolymerization initiator) dissolved in a solvent, drying, heating to a temperature for forming a discotic nematic phase, polymerizing the heated layer (e.g., by radiation of UV light) and cooling. The transition temperature from discotic nematic phase to solid phase is preferably in the range of 70 to 300° C., especially 70 to 170° C.

(Fixation of Alignment of Liquid Crystal Compound)

The aligned discotic liquid crystal molecules can be fixed with the alignment maintained. The discotic liquid crystal molecules are fixed preferably by a polymerization reaction. The polymerization reaction can be classified into a thermal reaction with a thermal polymerization initiator and a photo reaction with a photo polymerization initiator. A photo polymerization reaction is preferred.

Examples of the photo polymerization initiators include a-carbonyl compounds (described in U.S. Pat. Nos. 2,367, 661, 2,367,670), acyloin ethers (described in U.S. Pat. No. 2,448,828), a-hydrocarbon substituted acyloin compounds (described in U.S. Pat. No. 2,722,512), polycyclic quinone compounds (described in U.S. Pat. Nos. 2,951,758, 3,046, 127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with ultraviolet rays.

The exposure energy is preferably in the range of 20 to 50,000 mJ/cm$^2$, more preferably in the range of 20 to 5,000 mJ/cm$^2$, most preferably in the range of 100 to 800 mJ/cm$^2$. The light irradiation can be conducted while the layer is heated to accelerate the photo polymerization reaction. The protective layer may be provided on the optically anisotropic layer.

(Orientation Layer)

The orientation layer has a function of giving an orientation direction of the liquid crystal molecules. Preferred examples of the orientation layer include a layer of an organic compound (preferably polymer) subjected to rubbing treatment, an obliquely deposited layer of an inorganic compound, and a layer having micro grooves. Further, a built-up film formed according to Langmuir-Blodgett technique (LB technique) from w-tricosanoic acid, dioctadecyldimethylammoniumchloride or methyl stearate can be used as the orientation layer. In addition, a layer prepared by orienting dielectric materials by application of electric field or magnetic field can be employed as the orientation layer.

The orientation layer is preferably made of a polymer subjected to rubbing treatment. As the polymer, polyvinyl alcohol is preferred. Particularly, denatured polyvinyl alcohol having hydrophobic groups is preferred.

The orientation layer can be prepared from only one polymer. However, for preparing the orientation layer, a layer made of two crosslinked polymers is preferably subjected to rubbing treatment. At least one of the two polymers is preferably crosslinkable by itself or with a crosslinking agent.

The polymers which originally have functional groups or to which functional groups are introduced are reacted with light, heat or pH variation to form the orientation layer; or otherwise linking groups are introduced by a reactive crosslinking agent into the polymers so that the polymers can be crosslinked to form the orientation layer.

In a normal process, a coating liquid containing the polymers and, if needed, the crosslinking agent is applied on the cellulose acetate film, and then heated to induce the crosslinking reaction. The reaction may be caused at any stage from the step of coating the film with the coating liquid to the step of producing the resultant sheet.

In consideration of orientation of the liquid crystal molecules (in the optically anisotropic layer) on the orientation layer, the crosslinking reaction is preferably caused sufficiently after the molecules are aligned.

Generally, the coating liquid is applied, heated and dried to form the orientation layer on the cellulose acetate film. In that process, the liquid is preferably heated at such a low temperature that the molecules are fully crosslinked at the subsequent heating stage for forming the optically anisotropic layer described below.

Polymers crosslinkable either by itself or with crosslinking agents can be used. Some polymers are crosslinkable both by itself and with crosslinking agents. Examples of the polymers include polymethyl methacrylate, acrylic acid/ methacrylic acid copolymer, styrene/maleinimide copolymer, polyvinyl alcohol and denatured polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene, polycarbonate, and organic substances such as silan coupling agents.

Preferred examples are water-soluble polymers such as poly(N-methylolacrylamide), carboxymethylcellulose, gelatin, polyvinyl alcohol and denatured polyvinyl alcohol. Gelatin, polyvinyl alcohol and denatured polyvinyl alcohol are particularly preferred, and polyvinyl alcohol and denatured polyvinyl alcohol are further preferred.

It is most preferred to use two kinds of polyvinyl alcohols or denatured polyvinyl alcohols having different polymerization degrees.

The saponification degree of the polyvinyl alcohol is in the range of 70 to 100%, preferably in the range of 80 to 100%, more preferably in the range of 85 to 95%. The polymerization degree is preferably in the range of 100 to 3,000.

Examples of the denatured polyvinyl alcohol include polyvinyl alcohols denatured by copolymerization, by chain transfer and by block polymerization. Examples of the denaturing group in the copolymerization include COONa, $Si(OX)_3$, $N(CH_3)_3.Cl$, $C_9H_{19}COO$, $SO_3Na$ and $C_{12}H_{25}$ (in which X is hydrogen atom or an alkyl group). Examples of the denaturing group in the chain transfer include COONa, SH and $C_{12}H_{25}$. Examples of the denaturing group in the block polymerization include COOH, $CONH_2$, COOR and $C_6H_5$ (in which R is an alkyl group).

Non-denatured or denatured polyvinyl alcohols having saponification degrees of 80 to 100% are preferred, and those having saponification degrees of 85 to 95% are further preferred.

The denatured polyvinyl alcohol is preferably a product of reaction between polyvinyl alcohol and the compound represented by the following formula:

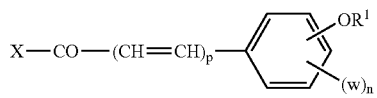

in which $R^1$ is an alkyl group, an acryloylalkyl group, a methacryloylalkyl group or an epoxyalkyl group; W is a halogen atom, an alkyl group or an alkoxy group; X is an atomic group required to form an active ester, an acid anhydride or a acid halide; p is 0 or 1; and n is an integer of 0 to 4.

Hereinafter, such denatured polyvinyl alcohol is referred to as "the particular denatured polyvinyl alcohol".

The denatured polyvinyl alcohol is more preferably a product of reaction between polyvinyl alcohol and the compound represented by the following formula:

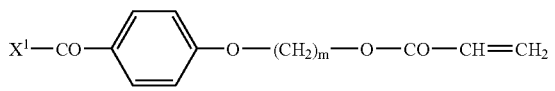

in which $X^1$ is an atomic group required to form an active ester, an acid anhydride or a acid halide; and m is an integer of 2 to 24.

The polyvinyl alcohol reacted with the compound represented by the above formulas are the aforementioned non-denatured polyvinyl alcohols or polyvinyl alcohols denatured by copolymerization, by chain transfer or by block polymerization. Preferred examples of the particular denatured polyvinyl alcohol are described in Japanese Patent Provisional Publication No. 9(1997)-152509.

With respect to the polyvinyl alcohol, Japanese Patent Provisional Publication No. 8(1996)-338913 describes the synthesis, the measurement of visible absorption spectrum and how to determine the amount of introduced denaturing groups.

Examples of the crosslinking agent include aldehydes, (e.g., formaldehyde, glyoxal, glutaraldehyde), N-methylol compounds (e.g., dimethylol urea, methyloldimethylhydantoin), dioxane derivatives (e.g., 2,3-dihydroxydioxane), compounds that works when the carboxylic group is activated (e.g., carbenium, 2-naphthalenesulfonate, 1,1-bispyrrolidino-1-chloropyridinium, 1-morpholinocarbonyl-3-(sulfonatoaminomethyl), active vinyl compounds (e.g., 1,3,5-triacryloyl-hexahydro-s-triazine, bis-(vinylsulfone) methane, N,N'-methylenebis-[b-vinylsulfonyl] propionamide), active halogen compounds (e.g., 2,4-dichloro-6-hydroxy-s-triazine), isooxazoles and dialdehyde starch. Two or more crosslinking agents may be used in combination.

They are used together with preferably water-soluble polymer, more preferably polyvinyl alcohol or denatured polyvinyl alcohol (including the above particular polyvinyl alcohol). Reactive aldehydes are preferred, and glutaraldehyde is particularly preferred in consideration of productivity.

The amount of the crosslinking agent is not particularly restricted. The more the crosslinking agent is added, the more the durability against moisture is improved. However, if the amount of crosslinking agent is 50 wt. % or more per the amount of the polymer, the resultant orientation layer poorly aligns the molecules. Accordingly, the amount of crosslinking agent is preferably in the range of 0.1 to 20 wt. %, more preferably in the range of 0.5 to 15 wt. % based on the amount of the polymer. Even after the crosslinking reaction is completed, the obtained orientation layer contains non-reacted crosslinking agent a little. The amount of the non-reacted crosslinking agent remaining in the orientation layer is preferably not more than 1.0 wt. %, more preferably not more than 0.5 wt. % based on the amount of the orientation layer. If the layer contains the non-reacted agent in an amount of more than 1.0 wt. %, the layer has poor durability. A liquid crystal display comprising such orientation layer often suffers troubles of reticulation if used for a long time or left under hot and humid condition.

The orientation layer can be formed by the steps of coating the cellulose acetate film with a coating liquid containing the above polymer and the crosslinking agent, heating to dry and crosslink the applied polymer, and subjecting the formed layer to rubbing treatment. The crosslinking reaction may be caused at any step after applying the coating liquid.

In the case where a water-soluble polymer such as polyvinyl alcohol is used, the coating solution is preferably prepared from a mixed solvent of water and an organic solvent having defoaming character (e.g., methanol). The ratio of water/methanol is normally in the range of 0:100 to 99:1, preferably in the range of 0:100 to 91:9. Because of defoaming character of the organic solvent, defects on the orientation layer are remarkably decreased, and accordingly the optically anisotropic layer has an improved surface.

As the coating method, known methods such as spin-coating, dip-coating, curtain-coating, extrusion-coating, bar-coating and E type-coating can be adopted. The E type-coating method is particularly preferred.

The thickness of the layer is preferably in the range of 0.1 to 10 μm. The applied layer can be dried at a temperature of 20 to 110° C. For ensuring sufficient crosslinking, the temperature is preferably in the range of 60 to 100° C., more preferably in the range of 80 to 100° C. The time for drying is in the range of 1 minute to 36 hours, preferably in the range of 5 minute to 30 minutes. The pH is also preferably adjusted at an optimal value according to the used crosslinking agent. If glutaraldehyde is used as the crosslinking agent, the pH is preferably in the range of 4.5 to 5.5, more preferably at 5.0.

The rubbing treatment can be conducted in the manner adopted widely for aligning liquid crystal molecules of LCD. The surface of the layer is rubbed with paper, cloth (gauze, felt, nylon, polyester) or rubber along a certain direction, to give the aligning function. Generally, the layer is rubbed several times with cloth on which fibers having the same length and thickness are provided.

(Polarizing Plate)

The polarizing plate comprises two transparent protective films and a polarizing membrane provided between the films. One of the protective films may be the cellulose acetate film of the invention, and the other may be a normal cellulose acetate film.

Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films.

It has been found that the moisture-permeability of the protective film is important for production of the polarizing plate. In producing the polarizing plate, the polarizing membrane and the protective film are laminated with an aqueous adhesive, and then the solvent of the adhesive is diffused into the film to dry. The higher permeability the film has, the more rapidly it is dried. Accordingly, the productivity of the polarizing plate is improved. However, if the permeability is too high, moisture in air is liable to come into the membrane to impair polarizability if the liquid crystal display is used under humid condition.

In the case where the cellulose acetate film of the invention is used as the protective film of the polarizing plate, the film has a moisture-permeability preferably in the range of 100 to 1,000 $(g/m^2)/24$ hours, more preferably in the range of 300 to 700 $(g/m^2)/24$ hours.

The moisture-permeability depends upon various conditions such as thickness, free volume, and hydrophilicity (hydrophobicity) of the polymer film (and the polymerizable liquid crystal compound).

In the film forming process, the thickness of the cellulose acetate film can be controlled by the conditions and procedures such as rip flow, line speed, stretching and/or compressing. According the materials, the thickness is controlled so that the preferred permeability can be obtained.

Also in the film forming process, the free volume of the cellulose acetate film can be controlled by drying conditions such as time and temperature. According to the materials, the free volume is controlled so that the preferred permeability can be obtained.

The hydrophilicity (hydrophobicity) of the cellulose acetate film can be controlled with additives. If hydrophilic additives are contained in the free volume, the permeability is increased. If hydrophobic additives are added, the permeability is decreased.

The moisture-permeability can be thus controlled, and thereby the polarizing plate having optical compensatory function can be produced at small cost with high productivity.

(Liquid Crystal Display)

The aforementioned cellulose acetate film or a polarizing plate comprising the film is advantageously used in a liquid crystal display, particularly in a liquid crystal display of transmission type.

A liquid crystal display of transmission type comprises a pair of polarizing plates and a liquid crystal cell placed between them. The polarizing plate comprises a pair of transparent protective films and a polarizing membrane placed between them. The liquid crystal cell comprises a pair of electrode substrates and liquid crystal provided between them.

The cellulose acetate film of the invention is placed between the cell and one or each of the polarizing plates.

The polarizing plate comprising the cellulose acetate film of the invention as a protective film can be used in place of one or each of the two polarizing plates in the liquid crystal display.

The liquid crystal cell works preferably according to TN mode, VA mode. IPS mode or OCB mode.

In a liquid crystal cell of TN mode, rod-like liquid crystal molecules are essentially horizontally aligned while voltage is not applied, and oriented in a twisted alignment with a twisted angle of 60 to 120°. The liquid crystal cell of TN mode is widely used in color TFT liquid crystal displays, and hence is described in many publications.

In a liquid crystal cell of VA mode, rod-like liquid crystal molecules are essentially vertically aligned while voltage is not applied.

The liquid crystal cell of VA mode include some types: (1) a liquid crystal cell of VA mode in a narrow sense (described in Japanese Patent Provisional Publication No. 2(1990)-176625 and Japanese Patent Publication No. 7(1995)-69536), in which rod-like liquid crystal molecules are essentially vertically aligned while voltage is not applied, and the molecules are essentially horizontally aligned while voltage is applied; (2) a liquid crystal cell of MVA mode (described in SID97, Digest of tech. Papers, 28(1997), 845), in which the VA mode is modified to be multi-domain type so as to enlarge the viewing angle; (3) a liquid crystal cell of n-ASM mode (described in Abstracts of Japanese Forum of Liquid Crystal (written in Japanese), (1998), pp. 58 to 59), in which rod-like liquid crystal molecules are essentially vertically aligned while voltage is not applied, and the molecules are essentially oriented in twisted multi-domain alignment while voltage is applied; (4) a cell of SURVAIVAL mode (presented in LCD International '98); and (5) a cell of CPA mode (presented in SID 2001).

A cell of IPS mode is described in detail in, for example, Asia Display '95, 577(1995), M. Oh-e, M. Ohta, S. Aratani, K. Kondo et. al.).

The liquid crystal cell of OCB mode is a liquid crystal cell of bend alignment mode in which rod-like liquid crystal molecules in upper part and ones in lower part are essentially reversely (symmetrically) aligned. A liquid crystal display having the liquid crystal cell of bend alignment mode is disclosed in U.S. Pat. Nos. 4,583,825 and 5,410,422. Since rod-like liquid crystal molecules in upper part and ones in lower part are symmetrically aligned, the liquid crystal cell of bend alignment mode has self-optical compensatory function. Therefore, this mode is referred to as OCB (optically compensatory bend) mode. The liquid crystal display of bend alignment mode has an advantage of responding rapidly.

EXAMPLE 1

The following components were placed in a mixing tank, heated and stirred to dissolve, to prepare a cellulose acetate solution.

| Cellulose acetate solution | |
| --- | --- |
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 54 weight parts |
| 1-Butanol (third solvent) | 11 weight parts |

In another mixing tank, 16 weight parts of the following retardation increasing agent, 80 weight parts of methylene chloride and 20 weight parts of methanol were placed, heated and stirred, to prepare a retardation increasing agent solution.

The cellulose acetate solution (479 weight parts) and the retardation increasing agent solution (21 weight parts) were mixed and stirred well to prepare a dope. The prepared dope contained the retardation increasing agent in the amount of 3.0 weight parts based on 100 weight parts of cellulose acetate.

Retardation Increasing Agent

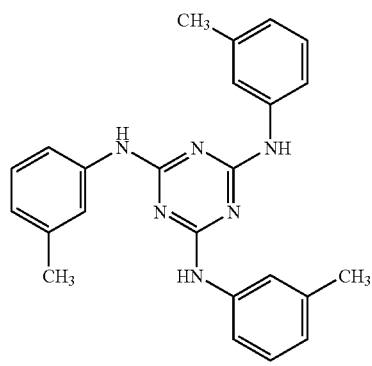

The dope was cast on a band by means of a band-casting machine. After the film temperature on the band reached 40° C., the film was peeled and dried with hot air at 140° C. Thus, a cellulose acetate film (thickness: 40 μm) in which the solvent remained in the amount of 0.3 wt. % was obtained.

The Re and Rth retardation values of the obtained cellulose acetate film (CAF-01) were measured at 550 nm by means of an ellipsometer [M-150, JASCO Corporation]. The results are set forth in Table 1.

(Bending Test)

The prepared cellulose acetate film (CAF-01) was cut to obtain a sample piece of 120 mm. According to ISO08776/2-1988, the sample was subjected to the bending test by means of a MIT bending tester. As a result, the sample was 310 times bent to break off.

EXAMPLE 2

The following components were placed in a mixing tank, heated and stirred to dissolve, to prepare a cellulose acetate solution.

| Cellulose acetate solution | |
| --- | --- |
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 54 weight parts |
| 1-Butanol (third solvent) | 11 weight parts |

In another mixing tank, 16 weight parts of the above retardation increasing agent, 80 weight parts of methylene chloride and 20 weight parts of methanol were placed, heated and stirred, to prepare a retardation increasing agent solution.

The cellulose acetate solution (486 weight parts) and the retardation increasing agent solution (14 weight parts) were mixed and stirred well to prepare a dope. The prepared dope contained the retardation increasing agent in the amount of 2.0 weight parts based on 100 weight parts of cellulose acetate.

The dope was cast on a band by means of a band-casting machine. After the film temperature on the band reached 40° C., the film was dried for 1 minute and then peeled off. While the volatile component remaining in the film was kept 15%, the film was uniaxially stretched in lateral direction by 10% with tenter. The film was then uniaxially stretched in longitudinal (transferring) direction by 10% while dried with hot air at 130° C., and further dried with hot air at 140° C. for 10 minutes to prepare a cellulose acetate film (thickness: 40 μm) in which the solvent remained in the amount of 0.3 wt. %.

The Re and Rth retardation values of the obtained cellulose acetate film (CAF-02) were measured at 550 nm by means of an ellipsometer [M-150, JASCO Corporation]. The results are set forth in Table 1.

(Bending Test)

The prepared cellulose acetate film (CAF-02) was cut to obtain a sample piece of 120 mm. According to ISO08776/2-1988, the sample was subjected to the bending test by means of a MIT bending tester. As a result, the sample was 280 times bent to break off.

COMPARISON EXAMPLE 1

The cellulose acetate solution was directly used as the dope, to prepare a cellulose acetate film (thickness: 110 μm) in which the solvent remained in the amount of 3.0 wt. %.

The Re and Rth retardation values of the obtained cellulose acetate film (CAF-H1) were measured at 550 nm by means of an ellipsometer [M-150, JASCO Corporation]. The results are set forth in Table 1.

(Bending Test)

The prepared cellulose acetate film (CAF-H1) was cut to obtain a sample piece of 120 mm. According to ISO08776/2-1988, the sample was subjected to the bending test by means of a MIT bending tester. As a result, the sample was 180 times bent to break off.

TABLE 1

|  | Film | Retardation increasing agent | Re | Rth |
|---|---|---|---|---|
| Ex. 1 | CAF-01 | 3.0 weight parts | 7 nm | 40 nm |
| Ex. 2 | CAF-02 | 2.0 weight parts | 2 nm | 45 nm |
| C. Ex. 1 | CAF-H1 | — | 4 nm | 48 nm |

EXAMPLE 3

Iodine was adsorbed on a stretched polyvinyl alcohol film to prepare a polarizing membrane. The cellulose acetate film (CAF-01) prepared in Example 1 was then laminated on one surface of the polarizing membrane with a polyvinyl alcohol adhesive.

On the other surface of the membrane, a commercially available cellulose triacetate film [FUJITAC TD80UF, Fuji Photo Film Co., Ltd.] was saponified and laminated with a polyvinyl alcohol adhesive. Thus, a polarizing plate was prepared.

EXAMPLE 4

Iodine was adsorbed on a stretched polyvinyl alcohol film to prepare a polarizing membrane. The cellulose acetate film (CAF-02) prepared in Example 2 was then laminated on one surface of the polarizing membrane with a polyvinyl alcohol adhesive.

On the other surface of the membrane, a commercially available cellulose triacetate film [FUJITAC TD80UF, Fuji Photo Film Co., Ltd.] was saponified and laminated with a polyvinyl alcohol adhesive. Thus, a polarizing plate was prepared.

COMPARISON EXAMPLE 2

Iodine was adsorbed on a stretched polyvinyl alcohol film to prepare a polarizing membrane. The cellulose acetate film (CAF-H1) prepared in Comparison Example 1 was then laminated on one surface of the polarizing membrane with a polyvinyl alcohol adhesive.

On the other surface of the membrane, a commercially available cellulose triacetate film [FUJITAC TD80UF, Fuji Photo Film Co., Ltd.] was saponified and laminated with a polyvinyl alcohol adhesive. Thus, a polarizing plate was prepared.

EXAMPLE 5

A pair of polarizing plates were removed from a commercially available liquid crystal display (20-inches liquid crystal TV, Sharp Corporation), which had a liquid crystal cell of TN mode. In place of the removed members, the polarizing plate prepared in Example 3 was laminated on each side (each of the backlight side and the observer side) of the cell with an adhesive so that the CAF-01 film (cellulose acetate film prepared in Example 1) might be on the liquid crystal cell side. The polarizing plates were arranged so that the transmission axes might be perpendicularly crossed, to prepare a liquid crystal display.

EXAMPLE 6

A pair of polarizing plates were removed from a commercially available liquid crystal display (20-inches liquid crystal TV, Sharp Corporation), which had a liquid crystal cell of TN mode. In place of the removed members, the polarizing plate prepared in Example 4 was laminated on each side (each of the backlight side and the observer side) of the cell with an adhesive so that the CAF-02 film (cellulose acetate film prepared in Example 2) might be on the liquid crystal cell side. The polarizing plates were arranged so that the transmission axes might be perpendicularly crossed, to prepare a liquid crystal display.

COMPARISON EXAMPLE 3

A pair of polarizing plates were removed from a commercially available liquid crystal display (20-inches liquid crystal TV, Sharp Corporation), which had a liquid crystal cell of TN mode. In place of the removed members, the polarizing plate prepared in Comparison Example 2 was laminated on each side (each of the backlight side and the observer side) of the cell with an adhesive so that the CAF-H1 film (cellulose acetate film prepared in Comparison Example 1) might be on the liquid crystal cell side. The polarizing plates were arranged so that the transmission axes might be perpendicularly crossed, to prepare a liquid crystal display.

(Evaluation of Frame-Like Light Leakage)

Each of the liquid crystal displays prepared in Examples 5, 6 and Comparison Example 3 was left at the temperature of 25° C. and the relative humidity of 65% for 5 hours while the backlight was kept on. After that, it was observed with the eyes whether each display frame-like leaked light or not. The results are set forth in Table 2.

TABLE 2

| Liquid crystal display | Light leakage |
|---|---|
| Example 5 | Not observed |
| Example 6 | Not observed |
| Comparison Example 3 | Light leaked frame-like |

The invention claimed is:

1. A cellulose acetate film comprising cellulose acetate having an acetic acid content of 59.0 to 61.5%, wherein the film has a Re retardation value defined by the following formula (I) in the range of 0 to 20 nm, a Rth retardation value defined by the following formula (II) in the range of 30 to 70 nm, and a thickness in the range of 10 to 70 μm:

$$Re = (nx - ny) \times d \qquad (I)$$

$$Rth = \{(nx + ny)/2 - nz\} \times d \qquad (II)$$

in which nx is a refractive index along the slow axis in the film plane; ny is a refractive index along the fast axis in the film plane; nz is a refractive index along the depth of the film; and d is the thickness of the film in terms of nm, and wherein the film is a biaxially stretched film.

2. The cellulose acetate film as defined in claim 1, wherein the film contains an aromatic compound having at least two aromatic rings in an amount of 0.01 to 20 weight parts based on 100 weight parts of cellulose acetate.

3. The cellulose acetate film as defined in claim 2, wherein the aromatic compound has at least one 1,3,5-triazine ring.

4. The cellulose acetate film as defined in claim 1, wherein the film has bending strength of 250 times or more, which is measured by means of a MIT bending tester.

5. The cellulose acetate film as defined in claim 1, wherein the film has been prepared from a cellulose acetate solution according to a solvent cast method.

6. The cellulose acetate film as defined in claim 5, wherein the film has been prepared by casting two or more cellulose acetate solutions simultaneously.

7. The cellulose acetate film as defined in claim 5, wherein the solvent of the cellulose acetate solution contains an ether having 3 to 12 carbon atoms, a ketone having 3 to 12 carbon atoms or an ester having 3 to 12 carbon atoms.

8. The cellulose acetate film as defined in claim 5, wherein the solvent of the cellulose acetate solution remains in an amount of 0.01 to 1 wt. % based on the amount of the film.

9. The cellulose acetate film as defined in claim 1, wherein the film contains a plasticizer in an amount of 0.1 to 25 wt. % based on the amount of cellulose acetate.

10. The cellulose acetate film as defined in claim 1, wherein the cellulose acetate film is biaxially stretched at an expanding ratio of stretching in the range of 3 to 50%.

11. The cellulose acetate film as defined in claim 1, wherein the cellulose acetate film has a thickness in the range of 20 to 60 μm.

12. A polarizing plate comprising a pair of transparent protective films and a polarizing membrane provided between them, at least one of said protective films being a cellulose acetate film comprising cellulose acetate having an acetic acid content of 59.0 to 61.5%, wherein the cellulose acetate film has a Re retardation value defined by the following formula (I) in the range of 0 to 20 nm, a Rth retardation value defined by the following formula (II) in the range of 30 to 70 nm and a thickness in the range of 10 to 70 μm:

$$Re = (nx - ny) \times d \quad (I)$$

$$Rth = \{(nx + ny)/2 - nz\} \times d \quad (II)$$

in which nx is a refractive index along the slow axis in the film plane; ny is a refractive index along the fast axis in the film plane; nz is a refractive index along the depth of the film; and d is the thickness of the film in terms of nm, and wherein the film is a biaxially stretched film.

13. The polarizing plate as defined in claim 12, wherein the cellulose acetate film contains an aromatic compound having at least two aromatic rings in an amount of 0.01 to 20 weight parts based on 100 weight parts of cellulose acetate.

14. The polarizing plate as defined in claim 12, wherein the cellulose acetate film is biaxially stretched at an expanding ratio of stretching in the range of 3 to 50%.

15. The polarizing plate as defined in claim 12, wherein the cellulose acetate film has a thickness in the range of 20 to 60 μm.

16. A liquid crystal display comprising a pair of polarizing plates and a liquid crystal cell placed between the plates, said polarizing plate comprising a pair of transparent protective films and a polarizing membrane provided between the films, and at least one of said protective films being a cellulose acetate film comprising cellulose acetate having an acetic acid content of 59.0 to 61.5%; wherein the cellulose acetate film has a Re retardation value defined by the following formula (I) in the range of 0 to 20 nm, a Rth retardation value defined by the following formula (II) in the range of 30 to 70 nm and a thickness in the range of 10 to 70 μm:

$$Re = (nx - ny) \times d \quad (I)$$

$$Rth = \{(nx + ny)/2 - nz\} \times d \quad (II)$$

in which nx is a refractive index along the slow axis in the film plane; ny is a refractive index along the fast axis in the film plane; nz is a refractive index along the depth of the film; and d is the thickness of the film in terms of nm, and wherein the film is a biaxially stretched film.

17. The liquid crystal display as defined in claim 16, wherein the cellulose acetate film contains an aromatic compound having at least two aromatic rings in an amount of 0.01 to 20 weight parts based on 100 weight parts of cellulose acetate.

18. The liquid crystal display as defined in claim 16, wherein the cellulose acetate film is biaxially stretched at an expanding ratio of stretching in the range of 3 to 50%.

19. The liquid crystal display as defined in claim 16, wherein the cellulose acetate film has a thickness in the range of 20 to 60 μm.

* * * * *